(12) United States Patent
Iwanaka et al.

(10) Patent No.: US 10,648,556 B2
(45) Date of Patent: May 12, 2020

(54) CONTROL DEVICE

(71) Applicant: AISIN AW CO., LTD., Anjo-shi, Aichi-ken (JP)

(72) Inventors: Makoto Iwanaka, Okazaki (JP); Yukiyasu Sukenari, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/310,183

(22) PCT Filed: Sep. 21, 2017

(86) PCT No.: PCT/JP2017/034169
§ 371 (c)(1),
(2) Date: Dec. 14, 2018

(87) PCT Pub. No.: WO2018/061992
PCT Pub. Date: Apr. 5, 2018

(65) Prior Publication Data
US 2019/0257418 A1    Aug. 22, 2019

(30) Foreign Application Priority Data

Sep. 30, 2016    (JP) ................. 2016-194989

(51) Int. Cl.
*F16H 61/12*    (2010.01)
*B60W 10/06*    (2006.01)
*F16H 61/22*    (2006.01)
*F16H 63/48*    (2006.01)

(52) U.S. Cl.
CPC ............. *F16H 61/12* (2013.01); *B60W 10/06* (2013.01); *F16H 61/22* (2013.01); *F16H 63/48* (2013.01); *B60W 2510/0638* (2013.01); *F16H 2061/1204* (2013.01)

(58) Field of Classification Search
None
See application file for complete search history.

(56) References Cited

U.S. PATENT DOCUMENTS

| 5,591,102 A | 1/1997 | White et al. | |
| 7,935,016 B2* | 5/2011 | Kawaguchi | F16H 61/061 192/85.32 |
| 8,676,460 B2* | 3/2014 | Ueno | F16H 59/105 701/58 |
| 2007/0161449 A1 | 7/2007 | Hayashi et al. | |

(Continued)

FOREIGN PATENT DOCUMENTS

| JP | 2007-177932 A | 7/2007 |
| JP | 2007-298083 A | 11/2007 |

(Continued)

OTHER PUBLICATIONS

Dec. 19, 2017 International Search Report issued in International Patent Application No. PCT/JP2017/034169.

*Primary Examiner* — Justin Holmes
(74) *Attorney, Agent, or Firm* — Oliff PLC

(57) ABSTRACT

A shift-by-wire type control device whose control target is an automatic transmission including a parking lock mechanism, the shift-by-wire type control device includes an electronic control unit that controls the automatic transmission in response to an instruction to select a shift range when selection of the shift range based on an operation on a to-be-operated part is performed.

13 Claims, 9 Drawing Sheets

(56) References Cited

U.S. PATENT DOCUMENTS

2008/0113848 A1* 5/2008 Inoue .................... F16H 61/12
477/98
2015/0291134 A1* 10/2015 Kamo .................... B60T 7/12
701/70
2018/0292005 A1* 10/2018 Neelakantan ........... F16H 61/32

FOREIGN PATENT DOCUMENTS

JP          2011-231841 A      11/2011
JP          2013-104463 A       5/2013

* cited by examiner

FIG. 9

|  | C1 | C2 | C3 | C4 | B1 | B2 | F |
|---|---|---|---|---|---|---|---|
| P |  |  |  |  |  |  |  |
| R |  |  | ○ |  |  | ○ |  |
| N |  |  |  |  |  |  |  |
| 1st | ○ |  |  |  |  | (○) | ○ |
| 2nd | ○ |  |  |  | ○ |  |  |
| 3rd | ○ |  | ○ |  |  |  |  |
| 4th | ○ |  |  | ○ |  |  |  |
| 5th | ○ | ○ |  |  |  |  |  |
| 6th |  | ○ |  | ○ |  |  |  |
| 7th |  | ○ | ○ |  |  |  |  |
| 8th |  | ○ |  |  | ○ |  |  |

CONTROL DEVICE

BACKGROUND

The present disclosure relates to a shift-by-wire type control device.

As a shift-by-wire type control device, there is known a control device described in JP 2013-104463 A. A control target of the control device described in JP 2013-104463 A is an automatic transmission including a parking lock mechanism, and the control device operates in response to an instruction from a range selection device in which selection of a shift range is not identified by the mechanical position of a to-be-operated part. Meanwhile, there is a case in which due to instantaneous power interruption of the control device, etc., the control device is reset and abnormally activated (reactivated), and in a shift-by-wire type using a range selection device such as that described above, when the control device is abnormally activated, a shift range having been selected before the abnormal activation cannot be identified from the mechanical position of the to-be-operated part. In addition, in a parking lock device (50) described in JP 2013-104463 A, a detent plate (62) is switched between two positions: a position in which the parking lock device (50) is placed in a locked state, and a position in which the parking lock device (50) is placed in an unlocked state. In such a configuration, even though it can be identified whether the shift range having been selected before abnormal activation is a parking range or a non-parking range from the state of the parking lock device (50), when the selected shift range is the non-parking range, it cannot be identified which one of a forward range, a reverse range, and a neutral range is the shift range from the state of the parking lock device (50).

In view of a problem specific to the shift-by-wire type control device such as that described above, JP 2013-104463 A describes a technique for appropriately setting a shift range after returning from a reset state of the control device. Specifically, JP 2013-104463 A describes that in order to suppress the occurrence of a strange noise caused by the parking lock device switched from an unlocked state to a locked state in a state of a high vehicle speed, when the vehicle speed upon returning from a reset state is higher than a preset threshold, the shift range is set to the neutral range. However, in such a configuration, even if the vehicle has been traveling (traveling at a higher speed than the above-described threshold) in the forward range before abnormal activation of the control device, the automatic transmission is switched to a neutral state after the abnormal activation of the control device, and thus, there is a possibility that driver's drivability may decrease, e.g., a driver perceives a loss of drive power. Hence, it is desired that when a reset of the control device has occurred, a state before the reset be able to be maintained, but in a configuration such as that described above, when a reset of the control device has occurred during traveling of the vehicle, a distinction between a neutral state and a forward range state has not been able to be made.

SUMMARY

Hence, it is desired to implement a technique capable of suppressing a reduction in driver's drivability associated with abnormal activation of a control device.

An exemplary aspect of the disclosure provides a shift-by-wire type control device whose control target is an automatic transmission including a parking lock mechanism, the shift-by-wire type control device including: an electronic control unit that controls the automatic transmission in response to an instruction to select a shift range when selection of the shift range based on an operation on a to-be-operated part is performed, wherein: the automatic transmission includes a transmission mechanism including a hydraulic actuated transmission engagement device; the electronic control unit controls a hydraulic control device that includes a solenoid and that controls hydraulic pressure supplied to the transmission engagement device, the solenoid operating by receiving power supply, the hydraulic control device is configured to form a specific shift speed in the transmission mechanism when power supply to the hydraulic control device is interrupted in a state in which a power transmission state is implemented by a forward range in the transmission mechanism, the specific shift speed being a predetermined forward shift speed, and the automatic transmission is controlled in the forward range when the transmission mechanism is in a state in which the specific shift speed is formed, when the electronic control unit is abnormally activated due to interruption of power supply to the electronic control unit during traveling of a vehicle.

According to this configuration, when the electronic control unit is abnormally activated during traveling of the vehicle, it can be determined whether the forward range has been selected before the abnormal activation, based on whether the specific shift speed is formed in the transmission mechanism. Then, in a situation in which it is estimated that the forward range has been selected before the abnormal activation of the electronic control unit, the automatic transmission can be controlled in the forward range after the abnormal activation of the electronic control unit. Thus, when the electronic control unit is abnormally activated during traveling of the vehicle in the forward range, the travel in the forward range can be continued, and as a result, it becomes possible to suppress a reduction in driver's drivability associated with the abnormal activation of the electronic control unit.

BRIEF DESCRIPTION OF THE DRAWINGS

FIG. 9 is an operation table for the automatic transmission shown in FIG. 8.

DETAILED DESCRIPTION OF EMBODIMENTS

An embodiment of a control device will be described with reference to the drawings. In the following descriptions, "drive-coupling" refers to a state in which two rotating elements are coupled to each other so that drive power can be transmitted. This concept includes a state in which two rotating elements are coupled to each other so as to rotate together, and a state in which two rotating elements are coupled to each other via one or more transmission members so that drive power can be transmitted. Such transmission members include various types of members (shafts, gear mechanisms, belts, chains, etc.) that transmit rotation at the same speed or at a changed speed, and may include engagement devices (friction engagement devices, mesh engagement devices, etc.) that selectively transmit rotation and drive power.

Figure 1:
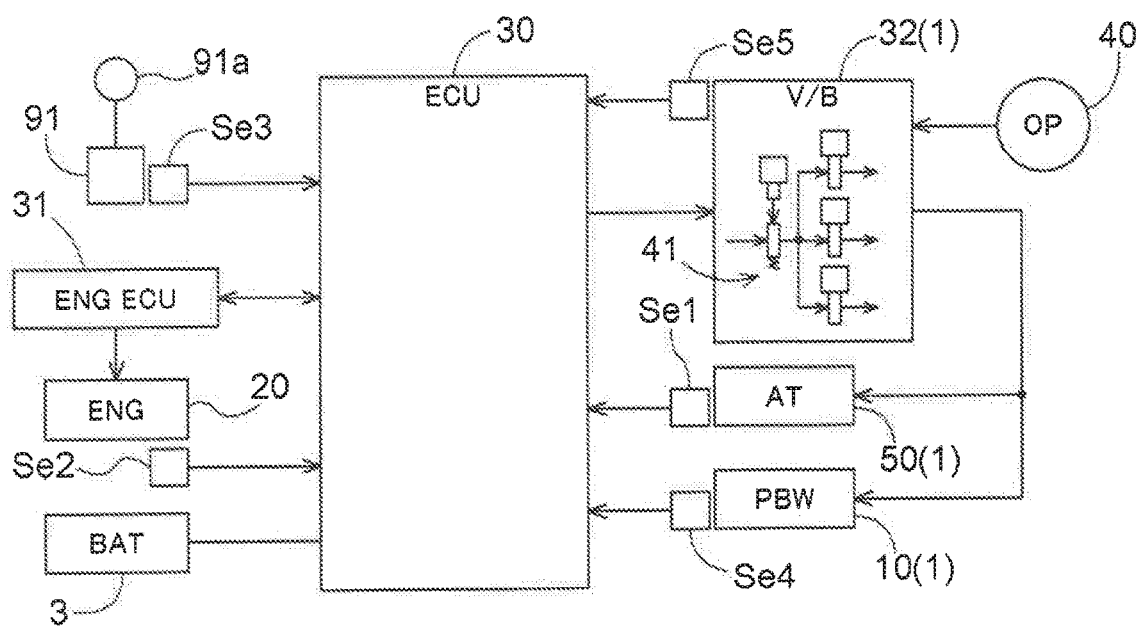
FIG. 1 is a block diagram showing a control configuration according to an embodiment.

As shown in FIG. 1, a control device 30 is a control device whose control target is an automatic transmission 1 including a parking lock mechanism 10. The control device 30 is a shift-by-wire type control device that controls, when selection of a shift range based on an operation on a to-be-operated part 91a is performed, the automatic transmission 1 in response to an instruction to select the shift range. Here, the control device 30 is a shift-by-wire type control device that operates in response to an instruction from a range selection device 91 in which selection of a shift range is not identified by the mechanical position of the to-be-operated part 91a. In FIG. 1, the control device 30 is represented as an ECU (Electronic Control Unit), a drive power source control device 31 as an ENG ECU (Engine Electronic Control Unit), a drive power source 20 as an ENG (Engine), a hydraulic control device 32 as a VB (Valve Body), a transmission mechanism 50 as an AT (Automatic Transmission), the parking lock mechanism 10 as a PBW (Park By Wire), a hydraulic pump 40 as an OP (Oil Pump), and a power source 3 as a BAT (Battery).

The automatic transmission 1 is provided in a power transmission path connecting the drive power source 20 to wheels (not shown). The drive power source 20 is a drive power source for a vehicle or the wheels. For example, an internal combustion engine is provided as the drive power source 20, or a rotating electrical machine is provided as the drive power source 20, or both of an internal combustion engine and a rotating electrical machine are provided as the drive power source 20. Here, the internal combustion engine is a prime mover that is driven by fuel combustion inside the engine to take out power (e.g., a gasoline engine or a diesel engine). In addition, the rotating electrical machine is used as a concept that includes all of a motor, a generator, and, as necessary, a motor-generator that functions as both a motor and a generator.

The automatic transmission 1 includes the transmission mechanism 50 that can change the gear ratio in a stepwise or stepless manner. Here, the "gear ratio" is the ratio of the rotational speed of an input member (a transmission input member 22 such as a transmission input shaft) of the transmission mechanism 50 to the rotational speed of an output member (a transmission output member 23 such as a transmission output shaft) of the transmission mechanism 50 (see FIG. 8). Rotation and torque are inputted to the transmission input member 22 from the side of the drive power source 20, and rotation and torque outputted from the transmission output member 23 are outputted to the side of the wheels. In the present embodiment, as shown in an example in FIG. 8, the transmission mechanism 50 is a stepped automatic transmission mechanism configured to be able to shift a plurality of shift speeds with different gear ratios. Though a detail will be described later, the transmission mechanism 50 includes gear mechanisms (in the example shown in FIG. 8, a first planetary gear mechanism PG1 and a second planetary gear mechanism PG2) and a plurality of transmission engagement devices 51 that perform engagement or disengagement of rotating elements of the gear mechanisms. The transmission mechanism 50 selectively forms a plurality of shift speeds according to the state of engagement of each of the plurality of transmission engagement devices 51, changes the speed of rotation of the transmission input member 22 at a gear ratio determined according to the shift speed, and transmits the rotation to the transmission output member 23.

In the present embodiment, the transmission mechanism 50 is configured to be able to form, as forward shift speeds, a plurality of shift speeds with different gear ratios. When a state in which the transmission mechanism 50 does not perform torque transmission is a "neutral state", in the present embodiment, the transmission mechanism 50 goes into the neutral state in a state in which all transmission engagement devices 51 are disengaged or a state in which some of the plurality of transmission engagement devices 51 that are engaged to form a shift speed are disengaged.

The plurality of transmission engagement devices 51 included in the transmission mechanism 50 are hydraulically actuated engagement devices (e.g., friction engagement devices). Hence, the automatic transmission 1 includes the hydraulic control device 32 that controls hydraulic pressure supplied to each transmission engagement device 51. The control device 30 controls the state of engagement of each transmission engagement device 51 by controlling, via the hydraulic control device 32, hydraulic pressure supplied to each transmission engagement device 51. The hydraulic control device 32 operates by receiving power supply from the power source 3 such as a battery. Specifically, the hydraulic control device 32 includes solenoids that operate by receiving power supply from the power source 3 such as a battery. The solenoids each function as an actuator for controlling hydraulic pressure supplied to a corresponding transmission engagement device 51. In the present embodiment, as will be described later, the hydraulic control device 32 includes solenoid valves in which a disc is driven by a solenoid. Since power supply to the hydraulic control device 32 is controlled by the control device 30, when a reset (abnormal activation) occurs in the control device 30, the power supply to the hydraulic control device 32 is interrupted during a period until control of the hydraulic control device 32 by the control device 30 resumes.

Though a detail will be described later, the hydraulic control device 32 includes solenoid valves that control hydraulic pressure supplied to the transmission engagement devices 51; and valve bodies provided with oil passages that communicate with the solenoid valves. By the solenoid valves and the oil passages, a hydraulic circuit 41 for supplying oil discharged from the hydraulic pump 40 to the transmission mechanism 50 is formed. The automatic transmission 1 (transmission mechanism 50) is configured to selectively form a plurality of shift speeds including a specific shift speed which will be described later, by the switching of the hydraulic circuit 41. The hydraulic circuit 41 is switched by the control device 30 controlling the state of each valve included in the hydraulic control device 32. For example, a mechanical oil pump driven by the drive power source 20 is provided as the hydraulic pump 40, or a motor-driven oil pump driven by a dedicated rotating electrical machine different than the drive power source 20 is provided as the hydraulic pump 40, or both of a mechanical oil pump and a motor-driven oil pump are provided as the hydraulic pump 40. As shown in an example in FIG. 10, the hydraulic control device 32 includes a line pressure regulator valve 63 (pressure regulator valve) that regulates discharge pressure from the hydraulic pump 40 to line pressure. In addition, though not shown, in the present embodiment, the hydraulic control device 32 includes a switching valve that switches between a state in which hydraulic oil pressure (in the present embodiment, line pressure) is supplied to a hydraulic actuator 14 and a state in which hydraulic oil pressure is not supplied to the hydraulic actuator 14. As will be described later, the hydraulic actuator 14 is an actuator for switching the lock state of the parking lock mechanism 10.

For the shift-by-wire type, there are a configuration in which a manual valve whose operating position is switched according to the position (rotational position) of a detent lever 15 (see FIG. 2) is provided, and by switching the position of the detent lever 15 by control performed by the control device 30 according to a selected shift range, the selected shift range is formed in the automatic transmission 1; and a configuration in which a manual valve whose operating position is switched according to the position of the detent lever 15 is not provided, and by controlling the states of a plurality of valves (solenoid valves, switching valves, etc.) by control (electrical instruction) performed by the control device 30, a selected shift range is formed in the automatic transmission 1. In the present embodiment, the latter configuration is adopted. Hence, in the present embodiment, the configuration is such that when a non-parking range (a forward range, a reverse range, a neutral range, etc.) other than a parking range is formed in the automatic transmission 1, a shift range formed in the automatic transmission 1 among a plurality of shift ranges included in non-parking ranges is not identified by the mechanical position of the parking lock mechanism 10 (detent lever 15).

The range selection device 91 is a device for shifting the shift range by a human operation. As shown in FIG. 1 in a simplified manner, the range selection device 91 has the to-be-operated part 91a which is operated by a driver of the vehicle. Namely, the to-be-operated part 91a is a portion of the range selection device 91 that is operated by the driver, e.g., a lever, a dial, or a touch panel. The range selection device 91 is configured such that selection of a shift range is not identified by the mechanical position of the to-be-operated part 91a. Thus, for example, when a lever is used as the to-be-operated part 91a, the lever is a momentary lever (a lever that automatically returns to its original position (home position) when a driver's operation force is released). In addition, for example, when a press switch is used as the to-be-operated part 91a, the switch is a momentary press switch (a press switch that automatically returns to its original position (home position) when a driver's pressing force is released). The range selection device 91 can also be configured to include a plurality of to-be-operated parts 91a. For example, the range selection device 91 can be configured to include two to-be-operated parts 91a: a to-be-operated part 91a for selecting the parking range and a to-be-operated part 91a that selects a non-parking range.

Figure 2:
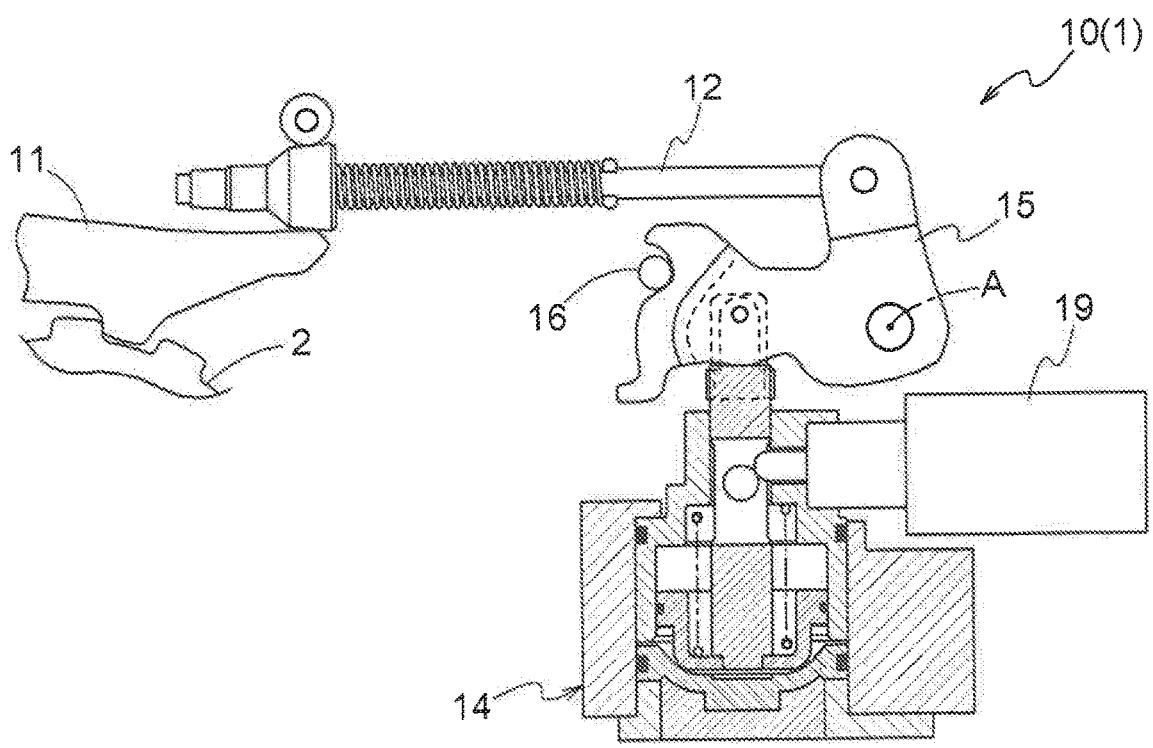
FIG. 2 is a schematic diagram of a parking lock mechanism according to the embodiment.

The parking lock mechanism 10 is a mechanism for allowing an engaging member to engage with a to-be-locked member which is a rotating member to be drive-coupled to the wheels, and thereby restricting the rotation of the to-be-locked member. As shown in FIG. 2, the parking lock mechanism 10 according to the present embodiment includes a parking gear 2 as the above-described to-be-locked member, and includes a parking pawl 11 as the above-described engaging member. The parking gear 2 is provided at the same location as the transmission output member 23 or more on the wheel side than the transmission output member 23 in the power transmission path connecting the drive power source 20 to the wheels. The parking gear 2 is provided so as to always rotate in conjunction with the wheels. Thus, by restricting the rotation of the parking gear 2 by the parking pawl 11, the wheels are locked. In the following, a state in which the engaging member (parking pawl 11) engages with the to-be-locked member (parking gear 2) (i.e., a state in which the wheels are locked) is referred to as "valid lock state", and a state in which the engagement of the engaging member with the to-be-locked member is released (i.e., a state in which the wheels are not locked) is referred to as "invalid lock state".

The parking lock mechanism 10 includes a parking rod 12 for allowing the parking pawl 11 to be displaced (in the present embodiment, to swing) between an engaged position in which the parking pawl 11 engages with the parking gear 2 and an unengaged position in which the engagement of the parking pawl 11 with the parking gear 2 is released. The parking rod 12 is provided with a cam member at its front-end portion (its end portion on the side of the parking pawl 11). The cam member is swingably supported on the parking rod 12 and is biased toward the front-end portion side. A base-end portion of the parking rod 12 is rotatably coupled to the detent lever 15 (detent plate). With the rotational movement around a swing shaft A of the detent lever 15 (movement in a counterclockwise direction in FIG. 2), the parking rod 12 moves to the side of the parking pawl 11, by which the parking pawl 11 is pressed by the cam member so as to engage with the parking gear 2, and the parking pawl 11 is maintained in the engaged position. In addition, with the rotational movement around the swing shaft A of the detent lever 15 (movement in a clockwise direction in FIG. 2), the parking rod 12 moves to a side away from the side of the parking pawl 11, by which the pressing of the parking pawl 11 by the cam member is released and the parking pawl 11 moves by a bias force of a biasing member (not shown), and the parking pawl 11 is maintained in the unengaged position.

In the present embodiment, a pair of concave parts with which an engaging member 16 engages is formed in the detent lever 15. When the lock state of the parking lock mechanism 10 is a valid lock state, the engaging member 16 engages with one of the pair of concave parts, and when the lock state of the parking lock mechanism 10 is an invalid lock state, the engaging member 16 engages with the other one of the pair of concave parts. As such, in the present embodiment, the position of the detent lever 15 is switched by the control device 30 between two positions: a first position for placing the parking lock mechanism 10 in a valid lock state and a second position for placing the parking lock mechanism 10 in an invalid lock state. Namely, the first position is the position of the detent lever 15 for when the parking range is formed in the automatic transmission 1, and the second position is the position of the detent lever 15 for when a non-parking range is formed in the automatic transmission 1.

As shown in FIG. 2, in the present embodiment, the parking lock mechanism 10 is configured to switch the lock state of the parking lock mechanism 10 between a valid lock state and an invalid lock state by the hydraulic actuator 14 allowing the parking rod 12 to move back and forth in a near-far direction relative to the parking pawl 11. Specifically, the hydraulic actuator 14 is configured to allow the parking rod 12 to move back and forth by allowing the detent lever 15 to swing around the swing shaft A according to hydraulic pressure supplied from the hydraulic control device 32. In the present embodiment, when hydraulic pressure (e.g., line pressure) is supplied to the hydraulic actuator 14 from the hydraulic control device 32, the parking lock mechanism 10 is switched to an invalid lock state, and when the supply of hydraulic pressure to the hydraulic actuator 14 from the hydraulic control device 32 is stopped, the parking lock mechanism 10 is switched to a valid lock state. In addition, in the present embodiment, the parking lock mechanism 10 includes a lock device 19 for allowing the parking lock mechanism 10 to be maintained in a lock released state even when the hydraulic pressure supplied to the hydraulic actuator 14 from the hydraulic control device 32 decreases. By including such a lock device 19, for example, even when the hydraulic pressure supplied to the hydraulic actuator 14 decreases by performing idle reduction control in which fuel supply to an internal combustion engine serving as the drive power source 20 is stopped with a vehicle's main power source remaining in an on state, the parking lock mechanism 10 can be maintained in a lock released state.

The control device 30 is configured to include, as a core member, an arithmetic processing unit such as a CPU, and include storage devices such as a RAM and a ROM, and the like. Each function performed by the control device 30 is implemented by software (programs) stored in the ROM, etc., or by hardware provided separately such as an arithmetic circuit, or by both of software and hardware. The arithmetic processing unit included in the control device 30 operates as a computer that executes each program. Note that the control device 30 may be configured by a set of a plurality of pieces of hardware (a plurality of separated pieces of hardware) that can communicate with each other.

The control device 30 is configured to be able to obtain information on detection results obtained by various types of sensors provided in each part of the vehicle. In the present embodiment, as shown in FIG. 1, the control device 30 is configured to be able to obtain information on detection results obtained by a first rotation sensor Se1, a second rotation sensor Se2, a range sensor Se3, a parking lock sensor Se4, and hydraulic pressure sensors Se5. Note that the control device 30 can also be configured to obtain detection information obtained by at least any one of the sensors, from another control device (e.g., the drive power source control device 31 which will be described later).

The first rotation sensor Se1 detects a rotational speed of a rotating member provided in the transmission mechanism 50 or a rotating member which is drive-coupled to the transmission mechanism 50. A single or a plurality of first rotation sensors Se1 are provided in the vehicle. The first rotation sensor Se1 provided in the vehicle includes a vehicle speed sensor for detecting a vehicle speed, and the control device 30 obtains information on a vehicle speed, based on detection information obtained by the first rotation sensor Se1. The vehicle speed sensor is, for example, a sensor that detects a rotational speed of the transmission output member 23.

The second rotation sensor Se2 detects a rotational speed (output rotational speed) of an output member of the drive power source 20. When the drive power source 20 is an internal combustion engine, the second rotation sensor Se2 is provided so as to detect a rotational speed of an output shaft (crankshaft) of the internal combustion engine or a member that always rotates in conjunction (e.g., rotates together) with the output shaft. In addition, when the drive power source 20 is a rotating electrical machine, the second rotation sensor Se2 is provided so as to detect a rotational speed of a rotor of the rotating electrical machine or a member that always rotates in conjunction (e.g., rotates together) with the rotor. The control device 30 obtains information on an output rotational speed of the drive power source 20, based on detection information obtained by the second rotation sensor Se2. In addition, the control device 30 obtains information on a rotational speed ratio between the input rotational speed and output rotational speed of the automatic transmission 1, based on detection information obtained by each of the first rotation sensor Se1 and the second rotation sensor Se2, or based on detection information obtained by each of a plurality of first rotation sensors Se1. Here, the input rotational speed of the automatic transmission 1 is the rotational speed of the transmission input member 22, and the output rotational speed of the automatic transmission 1 is the rotational speed of the transmission output member 23.

The range sensor Se3 detects a shift range selected by the driver using the range selection device 91. The range sensor Se3 electrically detects a driver's shift operation performed using the to-be-operated part 91a of the range selection device 91. The control device 30 obtains information on a shift range selected by the driver, based on detection information obtained by the range sensor Se3. The ranges selectable by the range selection device 91 include the forward range (D-range) which is a drive range allowing the vehicle to move forward; the reverse range (R-range) which is a drive range allowing the vehicle to move backward; the neutral range (N-range) for placing the automatic transmission 1 (transmission mechanism 50) in a neutral state; and the parking range (P-range) that places the automatic transmission 1 (transmission mechanism 50) in a neutral state and locks the wheels.

The parking lock sensor Se4 detects a physical quantity about the state of the parking lock mechanism 10. Namely, the parking lock sensor Se4 is a sensor that detects a lock state of the parking lock mechanism 10. The control device 30 distinguishes whether the parking lock mechanism 10 is in a valid lock state or an invalid lock state, based on detection information obtained by the parking lock sensor Se4. For example, one or both of a sensor that detects a rotational position of the detent lever 15 and a sensor that detects a position of a member in the hydraulic actuator 14 that moves in conjunction with the detent lever 15 is(are) provided as the parking lock sensor Se4 in the vehicle. In the present embodiment, the parking lock sensor Se4 corresponds to a "sensor".

The hydraulic pressure sensors Se5 detect hydraulic pressure in the hydraulic circuit 41 of the hydraulic control device 32. The hydraulic pressure sensors Se5 each are, for example, a hydraulic pressure switch that is turned on when the hydraulic pressure of a detection-target location is greater than or equal to a predetermined value, and is turned off when the hydraulic pressure of the detection-target location is less than the predetermined value, or a hydraulic pressure switch that is turned off when the hydraulic pressure of a detection-target location is greater than or equal to a predetermined value, and is turned on when the hydraulic pressure of the detection-target location is less than the predetermined value. As the hydraulic pressure sensor Se5, a sensor that outputs the value of hydraulic pressure of a detection-target location can also be used. The installation locations of the hydraulic pressure sensors Se5 will be described later.

When selection of a shift range (specifically, selection of any one of the shift ranges including the forward range, the reverse range, the neutral range, and the parking range) based on an operation on the to-be-operated part 91a is performed in the range selection device 91, the control device 30 performs normal control in which the automatic transmission 1 is controlled in response to an instruction to select the shift range. Specifically, when the parking range is selected by the range selection device 91, the control device 30 controls the parking lock mechanism 10 to a valid lock state, and when a non-parking range is selected by the range selection device 91, the control device 30 controls the parking lock mechanism 10 to an invalid lock state. As such, the parking lock mechanism 10 is not mechanically coupled to the range selection device 91, and the state of the parking lock mechanism 10 is controlled by the control device 30 based on detection information obtained by the range sensor Se3. Namely, the parking lock mechanism 10 according to the present embodiment is a park-by-wire (PBW) type parking lock mechanism.

In addition, when the forward range is selected by the range selection device 91, the control device 30 controls the hydraulic control device 32 such that the forward range (forward shift speed) is formed in the automatic transmission 1 (transmission mechanism 50). When the reverse range is selected by the range selection device 91, the control device 30 controls the hydraulic control device 32 such that the reverse range (reverse shift speed) is formed in the automatic transmission 1 (transmission mechanism 50). When the neutral range or the parking range is selected by the range selection device 91, the control device 30 controls the hydraulic control device 32 such that the automatic transmission 1 (transmission mechanism 50) is placed in a neutral state.

As shown in FIG. 1, the control targets of the control device 30 are the transmission mechanism 50 and the parking lock mechanism 10. In addition, the drive power source 20 is also a control target of the control device 30. The control device 30 determines wheel required torque which is required to drive the wheels, and a target shift speed to be formed in the automatic transmission 1 (transmission mechanism 50), based on sensor detection information (information such as an accelerator pedal position, a vehicle speed, and a shift range). Then, the control device 30 determines target torque of the drive power source 20 based on the determined wheel required torque, and controls the drive power source 20 such that the target torque is outputted. The control device 30 controls the transmission mechanism 50 such that the determined target shift speed is formed. Specifically, the control device 30 controls the state of engagement of each of the plurality of transmission engagement devices 51 such that the determined target shift speed is formed. The state of engagement of each transmission engagement device 51 is controlled to any one of a directly-coupling engaged state, a slip-engaged state, and a disengaged state, according to hydraulic pressure to be supplied.

In the present embodiment, the control device 30 is configured to control the drive power source 20 via the drive power source control device 31, and the drive power source control device 31 controls the drive power source 20 such that a target torque instructed by the control device 30 is outputted. In a case in which an internal combustion engine is provided as the drive power source 20, when there is a request to start the internal combustion engine from the control device 30, the drive power source control device 31 allows the internal combustion engine to start by, for example, starting fuel supply to the internal combustion engine and ignition of the internal combustion engine, and when there is a request to stop the internal combustion engine from the control device 30, the drive power source control device 31 allows the internal combustion engine to stop by, for example, stopping fuel supply to the internal combustion engine and ignition of the internal combustion engine.

Meanwhile, activation of the control device 30 includes activation associated with the switching of a vehicle's power source from off to on (i.e., activation of the vehicle) and activation performed after the control device 30 is reset due to an abnormality such as a reduction in power supply voltage or instantaneous power interruption. The former activation is normal activation taking place after activation of the vehicle and is hereinafter referred to "normal activation". On the other hand, the latter activation is activation associated with an abnormality and is hereinafter referred to as "abnormal activation". In the following descriptions, when there is no need to distinguish between the normal activation and the abnormal activation, i.e., when common matters for both the normal activation and the abnormal activation are described, the term "activation" is simply used without distinguishing between the normal activation and the abnormal activation. In the present embodiment, the automatic transmission 1 (transmission mechanism 50) is configured to form a predetermined specific forward shift speed when the control device 30 is abnormally activated with the forward range being selected. Namely, the hydraulic control device 32 according to the present embodiment has a limp-home function for all-off fail in which all solenoid valves included in the hydraulic control device 32 off-fail (go into a non-current-carrying state), and a shift speed that is formed by the limp-home function when all-off fail occurs with the forward range being formed in the automatic transmission 1 is the above-described specific shift speed. As such, the hydraulic control device 32 is configured such that when power supply to the hydraulic control device 32 is interrupted in a state in which a power transmission state is implemented by the forward range in the transmission mechanism 50, the specific shift speed which is a predetermined forward shift speed is formed in the transmission mechanism 50.

In the present embodiment, when the control device 30 is abnormally activated with the reverse range being selected, the automatic transmission 1 (transmission mechanism 50) goes into a neutral state. Namely, in all of a case in which the control device 30 is abnormally activated with the reverse range being selected, a case in which the control device 30 is abnormally activated with the neutral range being selected, and a case in which the control device 30 is abnormally activated with the parking range being selected, the automatic transmission 1 (transmission mechanism 50) goes into a neutral state. As such, the hydraulic control device 32 is configured to place the transmission mechanism 50 in a neutral state when power supply to the hydraulic control device 32 is interrupted in a state in which a power transmission state is interrupted in the neutral range in the transmission mechanism 50 (a state in which power transmission is interrupted). In addition, the hydraulic control device 32 is configured to place the transmission mechanism 50 in a neutral state when power supply to the hydraulic control device 32 is interrupted in a state in which a power transmission state is implemented by the reverse range in the transmission mechanism 50.

During a period from when the control device 30 is activated until selection of a shift range based on an operation on the to-be-operated part 91a is performed, the control device 30 performs normal activation control when the activation is normal activation taking place after activation of the vehicle, and performs abnormal activation control when the activation is abnormal activation. Here, the normal activation control is control in which either one of shift ranges including the neutral range and the parking range is selected and the automatic transmission 1 is controlled according to the selected shift range. In addition, the abnormal activation control is control in which any one of shift ranges including the neutral range, the parking range, and the forward range is selected and the automatic transmission 1 is controlled according to the selected shift range. When selection of a shift range based on an operation on the to-be-operated part 91*a* is performed after the activation of the control device 30, the control device 30 performs the above-described normal control. In the present embodiment, in the abnormal activation control, it is determined whether to select the forward range, based on at least a vehicle speed, and when the forward range is not selected, it is determined which one of the neutral range and the parking range is to be selected, based on at least the lock state of the parking lock mechanism 10. In an example shown in FIG. 6 which will be referred to later, the forward range is selected on the condition that at least the vehicle speed is greater than or equal to a predetermined threshold (in the example shown in FIG. 6, a second threshold at step #36). Note that in the present description, the vehicle speed in a forward direction is positive and the vehicle speed in a backward direction is negative, and the above-described threshold is set to a value of 0 or greater. In addition, in the example shown in FIG. 6, when the lock state of the parking lock mechanism 10 is a valid lock state, the parking range is selected.

In the abnormal activation control, it is determined whether to select the forward range, based further on whether the specific shift speed is formed. In the example shown in FIG. 6, it is determined whether to select the forward range, based on the vehicle speed and whether the specific shift speed is formed. Specifically, the forward range is selected on the conditions that the vehicle speed is greater than or equal to the predetermined threshold (second threshold) and the specific shift speed is formed (step #34 to #37 in FIG. 6). Namely, the control device 30 controls the automatic transmission 1 in the forward range if the transmission mechanism 50 is in a state in which the specific shift speed is formed, when the control device 30 is abnormally activated due to interruption of power supply (here, power supply from the power source 3) to the control device 30 during traveling of the vehicle (here, a state in which the vehicle speed is greater than or equal to the second threshold). The control of the automatic transmission 1 in the forward range is performed during a period until selection of a shift range based on an operation on the to-be-operated part 91*a* is performed. The value of the second threshold can be set to, for example, a lower limit speed (e.g., 7 km/h) at which the reverse range is not formed, for a case of a configuration in which even if the reverse range is selected by mistake during forward traveling, the reverse range is not formed. By thus setting the second threshold, a configuration can be formed in which the forward range is not selected in a situation in which, when the driver performs an operation to select the reverse range using the to-be-operated part 91*a* during a period from when a reset of the control device 30 occurs until the control device 30 is abnormally activated, if the reset of the control device 30 has not occurred, then the reverse range has been formed. By this, it becomes possible to avoid the generation of drive power in the forward direction which is the opposite direction to a driver's will to travel backward. As such, by making a determination based not only on whether the specific shift speed is formed but also on the vehicle speed, when the vehicle has been traveling in the forward range at a relatively high speed before abnormal activation of the control device 30, the forward range is continuously formed in the automatic transmission 1 (transmission mechanism 50), by which it becomes possible to avoid the generation of drive power in the opposite direction to a driver's will or intention such as that described above, while maintaining driver's drivability.

In the present embodiment, the control device 30 determines whether the specific shift speed is formed, based on the rotational speed ratio between the input rotational speed and output rotational speed of the automatic transmission 1 (transmission mechanism 50) and the state of the hydraulic circuit 41. Specifically, the control device 30 determines that the specific shift speed is formed, on the conditions that the rotational speed ratio between the input rotational speed (the rotational speed of the transmission input member 22) and output rotational speed (the rotational speed of the transmission output member 23) of the automatic transmission 1 matches a value obtained when the specific shift speed is formed (i.e., the gear ratio of the specific shift speed) and the state of the hydraulic circuit 41 matches a state obtained when the specific shift speed is formed (step #34 and #35). Note that the term "match" used in the expression "when the rotational speed ratio between the input rotational speed and output rotational speed of the transmission mechanism 50 matches the gear ratio of the specific shift speed" is used as a concept that includes not only a case of a complete match, but also a shift in range considering detection errors of sensors used to derive a rotational speed ratio, such as the first rotation sensor Se1 and the second rotation sensor Se2.

In addition, the state of the hydraulic circuit 41 is obtained based on detection information obtained by the above-described hydraulic pressure sensors Se5. The hydraulic pressure sensors Se5 are provided in the hydraulic control device 32, and detect the states of hydraulic pressure supply to at least some of the plurality of transmission engagement devices 51. Specifically, transmission engagement devices 51 that are engaged to form the specific shift speed among the plurality of transmission engagement devices 51 serve as "specific engagement devices", and the hydraulic pressure sensors Se5 are provided so as to be able to obtain the state of hydraulic pressure supply to at least each of the specific engagement devices among the plurality of transmission engagement devices 51. Then, the control device 30 determines, based on detection information obtained by the hydraulic pressure sensors Se5, whether the state of the hydraulic circuit 41 matches a state obtained when the specific shift speed is formed. Namely, a comparison is made between the detection information obtained by the hydraulic pressure sensors Se5 and the states of engagement of respective transmission engagement devices 51 obtained when the specific shift speed is formed, and when transmission engagement devices 51 determined to be engaged based on the detection results of the hydraulic pressure sensors Se5 match the specific engagement devices (in a case of a plurality of specific engagement devices, when a combination of transmission engagement devices 51 determined to be engaged matches a combination of the specific engagement devices; the same applies hereinafter), the control device 30 determines that the state of the hydraulic circuit 41 matches the state obtained when the specific shift speed is formed. In the present embodiment, the specific engagement devices each are a normally-opened engagement device that goes into a disengaged state in a state in which hydraulic pressure is not supplied to a hydraulic servomechanism. Hence, when transmission engagement devices 51 that are determined, based on the detection information obtained by the hydraulic pressure sensors Se5, to have hydraulic servomechanism 42 to which hydraulic pressure is supplied match the specific engagement devices, the control device 30 determines that the state of the hydraulic circuit 41 matches the state obtained when the specific shift speed is formed.

As such, in the present embodiment, the control device 30 determines whether the specific shift speed is formed, based also on the state of the hydraulic circuit 41 in addition to the rotational speed ratio between the input rotational speed and output rotational speed of the automatic transmission 1. Specifically, the control device 30 determines whether the transmission mechanism 50 is in a state in which the specific shift speed is formed, based on a comparison between detection information of a rotational speed ratio between the input rotational speed and output rotational speed of the transmission mechanism 50 and the gear ratio of the specific shift speed, and based on a comparison between detection information obtained by the hydraulic pressure sensors Se5 and the states of engagement of respective transmission engagement devices 51 obtained when the specific shift speed is formed. Namely, when the detected value of the rotational speed ratio between the input rotational speed and output rotational speed of the transmission mechanism 50 matches the gear ratio of the specific shift speed and transmission engagement devices 51 that are determined to be engaged based on detection results of the hydraulic pressure sensors Se5 match the specific engagement devices, the control device 30 determines that the transmission mechanism 50 is in a state in which the specific shift speed is formed. By thus determining whether the specific shift speed is formed in the transmission mechanism 50, it becomes possible to suppress an erroneous determination that the specific shift speed is formed, in a situation in which despite the fact that the specific shift speed is not formed, the rotational speed ratio between the input rotational speed and output rotational speed of the automatic transmission 1 accidentally matches the value obtained when the specific shift speed is formed.

In the present embodiment, a period of time from when the control device 30 is abnormally activated until the specific shift speed is formed in the automatic transmission 1 serves as transition time, and it is configured such that in abnormal activation control, a determination as to whether the specific shift speed is formed is made after a point in time when the transition time has elapsed from the occurrence of the abnormal activation. By this, a determination as to whether the specific shift speed is formed is avoided from being made during shifting to the specific shift speed, enabling to more accurately determine whether the forward range has been selected before the activation of the control device 30. For example, the configuration can also be such that obtaining a rotational speed ratio between the input rotational speed and output rotational speed of the automatic transmission 1 and obtaining the state of the hydraulic circuit 41 are continuously performed during a predetermined period after a point in time when the transition time has elapsed from the occurrence of abnormal activation of the control device 30, and a determination as to whether the specific shift speed is formed is made based on information (e.g., mean values) obtained during the period. For the vehicle speed, too, likewise, a determination as to whether the vehicle speed is greater than or equal to the predetermined threshold may be made using information (e.g., a mean value) obtained during a predetermined period.

In the present embodiment, the control device 30 is configured such that the control device 30 performs, after activation, an activation type determination process that determines whether the activation is abnormal activation or normal activation taking place after activation of the vehicle, and performs normal activation control when it is determined by the activation type determination process that the activation is normal activation, and performs abnormal activation control when it is determined by the activation type determination process that the activation is abnormal activation. In the present embodiment, normal activation control is performed when it is determined by the activation type determination process that the activation is normal activation, and abnormal activation control is performed when it is not determined by the activation type determination process that the activation is normal activation (when it is determined that the activation is not normal activation). Thus, for example, even when the control device 30 is activated by switching the vehicle's power source from off to on, if the activation is not determined to be normal activation due to a failure of the parking lock sensor Se4, etc., then abnormal activation control is performed. Namely, even when the activation is activation associated with the switching of the vehicle's power source from off to on (activation taking place after activation of the vehicle), if there is an abnormality such as a failure of the parking lock sensor Se4, the activation is considered abnormal activation.

In the normal activation control, it is determined which one of the neutral range and the parking range is to be selected, based on at least the lock state of the parking lock mechanism 10. Namely, when the control device 30 determines that the activation is normal activation, the control device 30 controls the automatic transmission 1 in either one of the neutral range and the parking range. The control of the automatic transmission 1 in either one of the neutral range and the parking range is performed during a period until selection of a shift range based on an operation on the to-be-operated part 91a is performed. In an example shown in FIG. 5, when the lock state of the parking lock mechanism 10 is a valid lock state, the parking range is selected, and when the lock state of the parking lock mechanism 10 is an invalid lock state, the neutral range is selected. By adopting such a configuration, when the activation of the control device 30 is normal activation, the time from when the control device 30 is activated until a shift range (the neutral range or the parking range) is selected can be reduced. When an internal combustion engine is provided as the drive power source 20, a condition that the shift range is the neutral range or the parking range is generally one of start conditions of the internal combustion engine, and since, as described above, the time from when the control device 30 is activated until the neutral range or the parking range is selected can be reduced, an improvement in a response upon allowing the internal combustion engine to start after normal activation of the control device 30 can be achieved.

In the present embodiment, in the activation type determination process, it is determined that the activation is normal activation on the conditions that at least the vehicle speed is zero and the output rotational speed of the drive power source 20 of the vehicle is zero. Furthermore, in the present embodiment, in the activation type determination process, it is determined that the activation is normal activation on the further condition that at least either one of a condition that there is no discharge of hydraulic pressure from the hydraulic pump 40 that supplies hydraulic pressure to the automatic transmission 1 and a condition that there is no failure in the parking lock sensor Se4 that detects the lock state of the parking lock mechanism holds true. Specifically, in the present embodiment, it is determined that the activation of the control device 30 is normal activation on the conditions that the vehicle speed is zero, the output rotational speed of the drive power source 20 of the vehicle is zero, there is no discharge of hydraulic pressure from the hydraulic pump 40, and furthermore, there is no failure in the parking lock sensor Se4. In the present embodiment, the hydraulic pressure sensors Se5 provided in the hydraulic circuit 41 of the hydraulic control device 32 each include a discharge presence/absence determination sensor for determining whether there is discharge of hydraulic pressure from the hydraulic pump 40. The discharge presence/absence determination sensor detects, for example, hydraulic pressure at a location where hydraulic pressure is not supplied from the hydraulic pump 40 in a situation in which the control device 30 is normally activated and where hydraulic pressure is supplied from the hydraulic pump 40 in a situation in which the control device 30 is abnormally activated. The control device 30 determines whether there is discharge of hydraulic pressure from the hydraulic pump 40, based on detection information obtained by the discharge presence/absence determination sensors.

By thus including a condition that there is no discharge of hydraulic pressure from the hydraulic pump 40 in conditions for determining normal activation, for example, an advantageous effect such as that shown below can be obtained. When an internal combustion engine is provided as the drive power source 20, the vehicle that performs idle reduction control in which the internal combustion engine is stopped with the vehicle's main power source remaining in an on state may include a motor-driven oil pump serving as the hydraulic pump 40; and an accumulator that operates (accumulates or discharges) using discharge pressure of the motor-driven oil pump as operating pressure. In this case, when the control device 30 is abnormally activated while the vehicle is being stopped and idle reduction control is being performed, upon the abnormal activation of the control device 30, the motor-driven oil pump goes into a state of discharging hydraulic pressure according to the operating pressure of the accumulator, instead of going into a state of no discharge of hydraulic pressure. By including a condition that there is no discharge of hydraulic pressure from the hydraulic pump 40 in conditions for determining normal activation, it becomes possible to accurately determine that the activation of the control device 30 in the above-described situation is abnormal activation.

Figure 3:
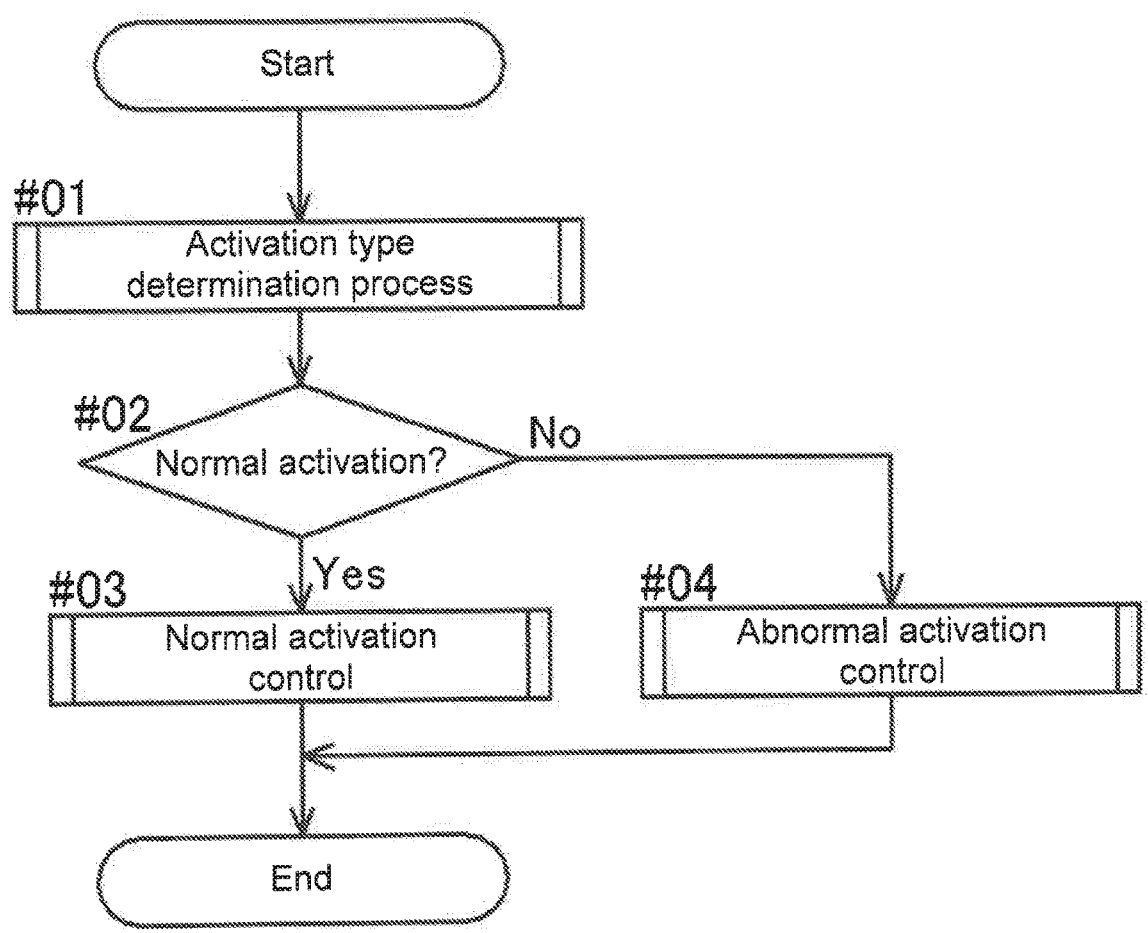
FIG. 3 is a flowchart showing a processing procedure for control upon activation according to the embodiment.

Next, an example of a processing procedure for control upon activation (control performed upon activation of the control device 30) according to the present embodiment will be described with reference to FIGS. 3 to 6. As shown in FIG. 3, after activation, the control device 30 performs an activation type determination process (step #01). Then, if it is determined that the activation is normal activation taking place after activation of the vehicle (step #02: Yes), normal activation control is performed (step #03). If it is determined that the activation is abnormal activation, in other words, if it is not determined that the activation is normal activation (step #02: No), abnormal activation control is performed (step #04), and the process ends.

Figure 4:
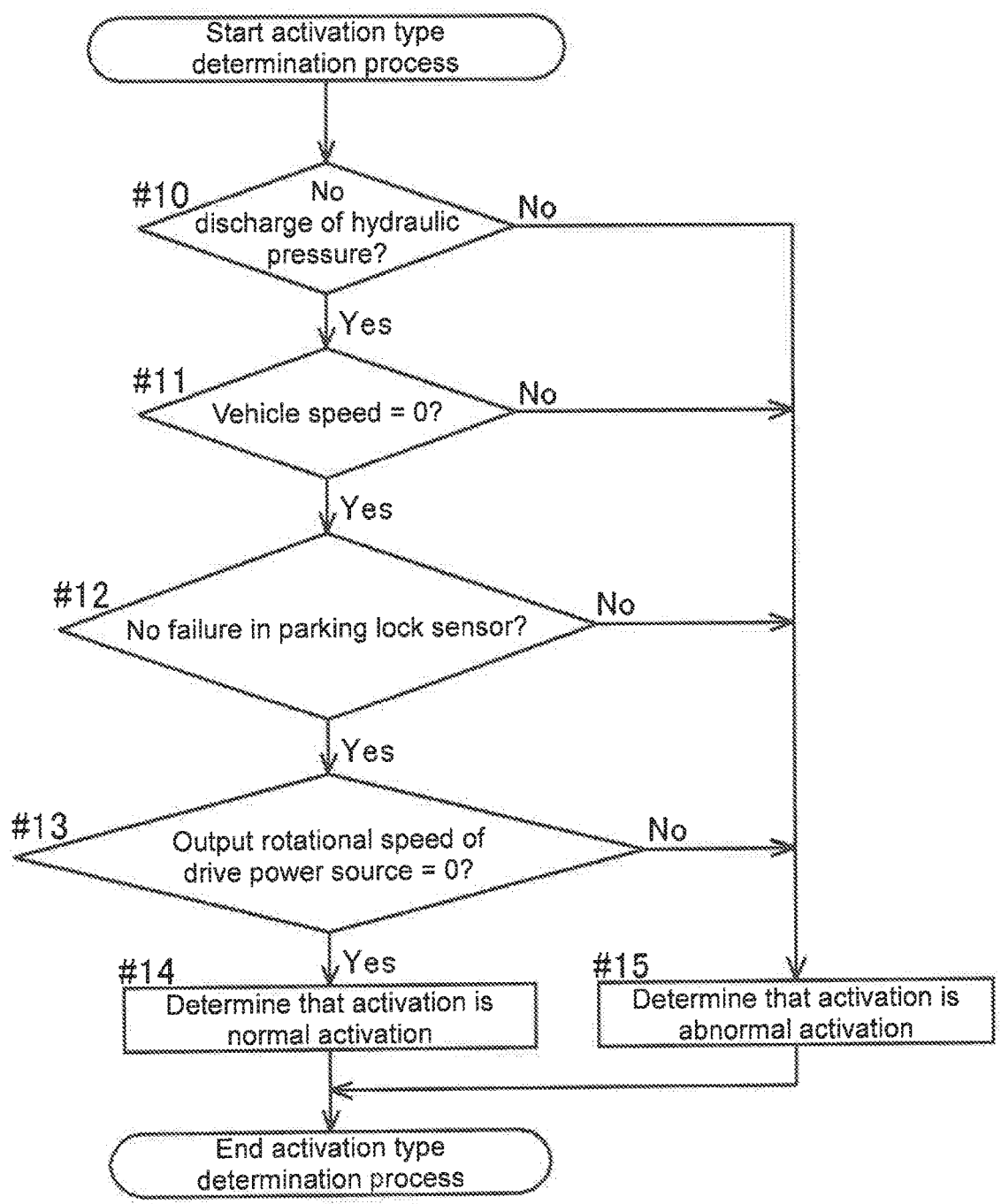
FIG. 4 is a flowchart showing a processing procedure for an activation type determination process according to the embodiment.

A processing procedure for the activation type determination process at step #01 of FIG. 3 will be described with reference to FIG. 4. As shown in FIG. 4, if there is no discharge of hydraulic pressure from the hydraulic pump 40 (step #10: Yes), the vehicle speed is zero (step #11: Yes), there is no failure in the parking lock sensor Se4 (step #12: Yes), and furthermore, the output rotational speed of the drive power source 20 is zero (step #13: Yes), the control device 30 determines that the activation of the control device 30 is normal activation (step #14). Unless an affirmative determination is made at all step #10 to #13, in other words, if a negative determination is made at even one of step #10 to #13, it is determined that the activation of the control device 30 is abnormal activation (it is determined that the activation is not normal activation) (step #15). Note that the determination order of step #10 to #13 can be changed as appropriate, and it is also possible to simultaneously make at least some of the determinations.

Figure 5:
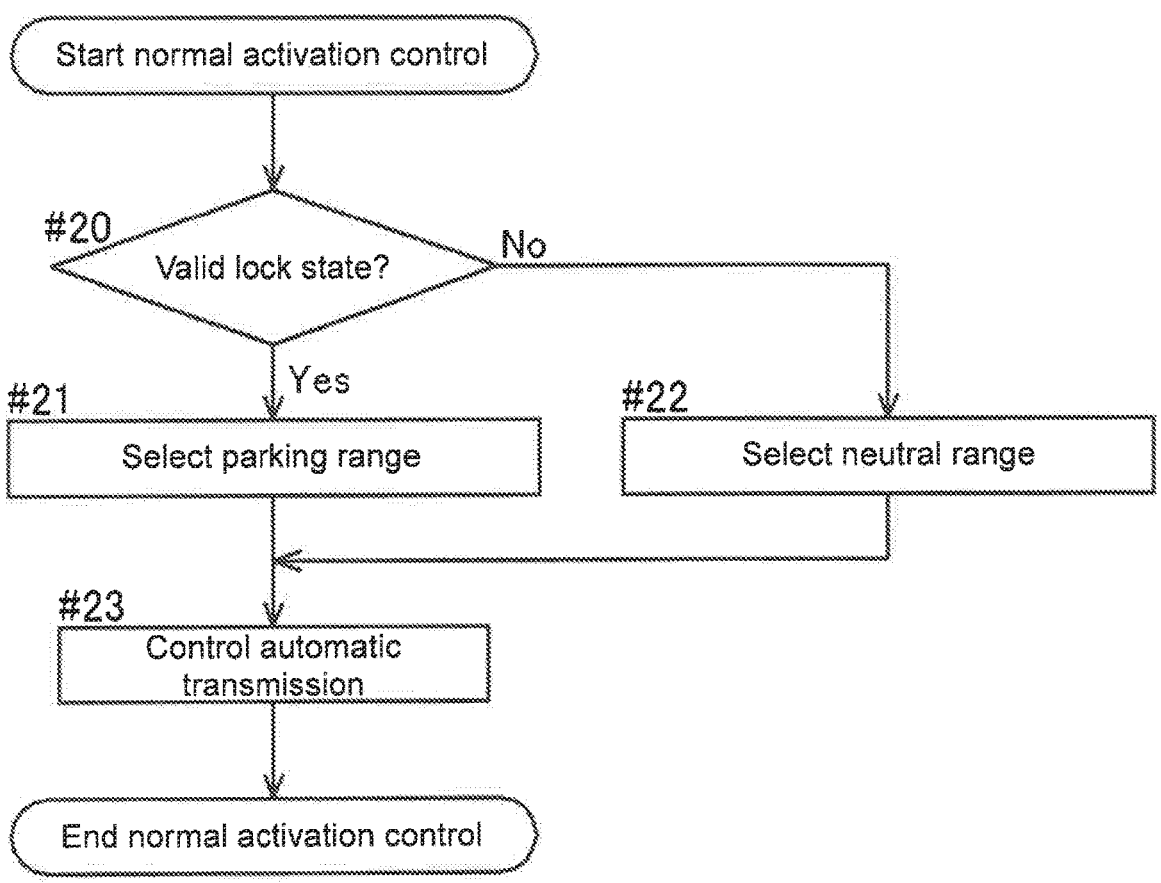
FIG. 5 is a flowchart showing a processing procedure for normal activation control according to the embodiment.

A processing procedure for the normal activation control at step #03 of FIG. 3 will be described with reference to FIG. 5. As shown in FIG. 5, if the lock state of the parking lock mechanism 10 is a valid lock state (step #20: Yes), the control device 30 selects the parking range (step #21), and if the lock state of the parking lock mechanism 10 is an invalid lock state (step #20: No), the control device 30 selects the neutral range (step #22). Then, the control device 30 controls the automatic transmission 1 such that the selected shift range is formed (step #23).

Figure 6:
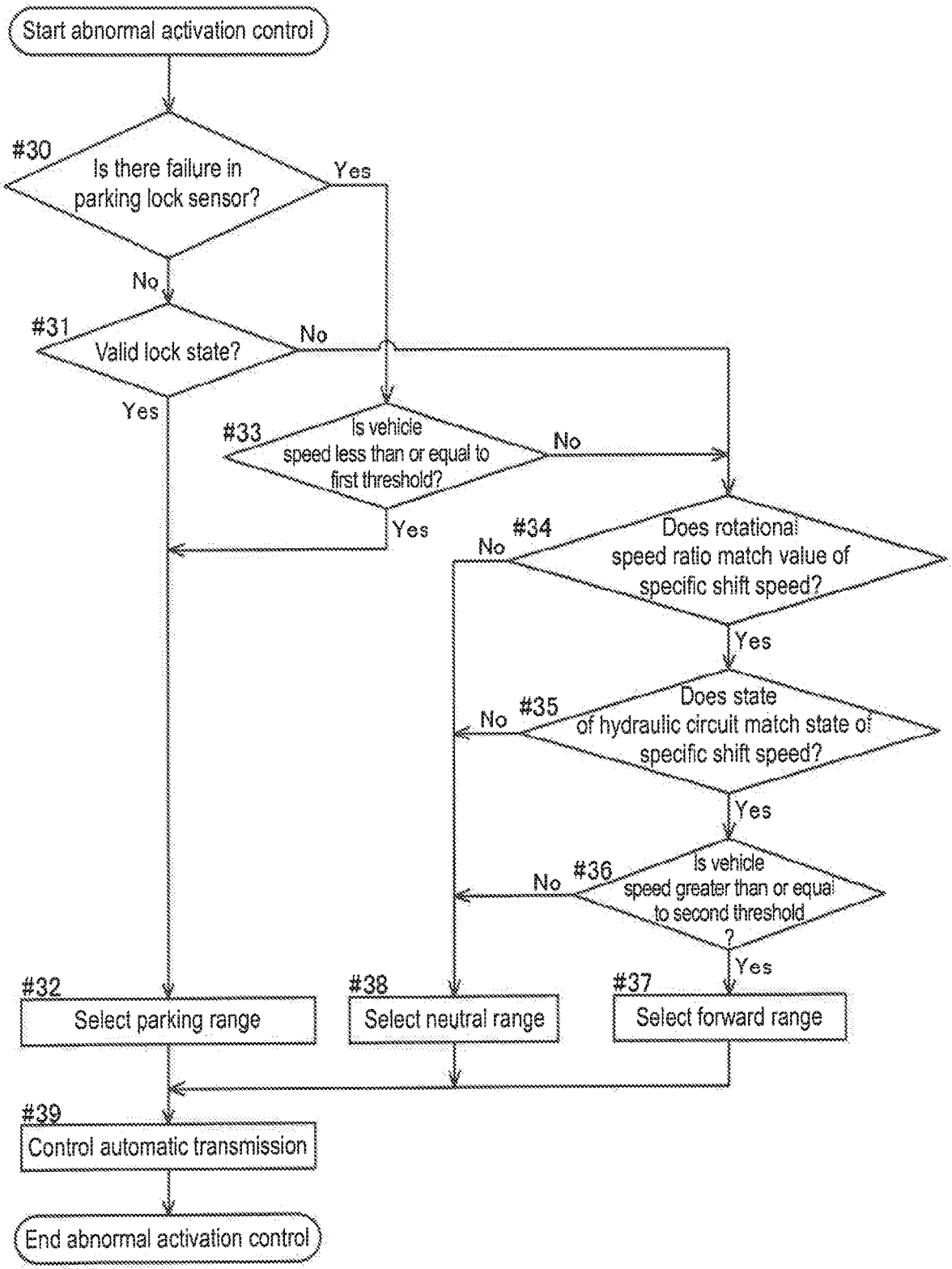
FIG. 6 is a flowchart showing a processing procedure for abnormal activation control according to the embodiment.

A processing procedure for the abnormal activation control at step #04 of FIG. 3 will be described with reference to FIG. 6. The control device 30 determines whether there is a failure in the parking lock sensor Se4 (step #30), and if there is no failure in the parking lock sensor Se4 (step #30: No), the control device 30 selects the parking range (step #32) on the condition that the lock state of the parking lock mechanism 10 is a valid lock state (step #31: Yes), and controls the automatic transmission 1 such that the parking range is formed (step #39). In addition, even if there is a failure in the parking lock sensor Se4 (step #30: Yes), if the vehicle speed is less than or equal to a predetermined first threshold (step #33: Yes), the parking range is selected (step #32), and the automatic transmission 1 is controlled such that the parking range is formed (step #39). As such, when the control device 30 is abnormally activated, if there is a failure in the parking lock sensor Se4 and the vehicle speed is less than or equal to the predetermined threshold (here, the first threshold), the automatic transmission 1 is controlled in the parking range, regardless of whether the specific shift speed is formed in the transmission mechanism 50. The control of the automatic transmission 1 in the parking range is performed during a period until selection of a shift range based on an operation on the to-be-operated part 91a is performed. The first threshold is set to a value of 0 or greater. The first threshold can be set to a smaller value than the second threshold and can be set to, for example, 5 km/h. By setting the first threshold to a positive value, even if the vehicle speed is not zero, when the vehicle speed is a relatively low speed, the parking range is selected and the wheels are locked, by which movement of the vehicle against a driver's will particularly on a hill, etc., is readily avoided.

On the other hand, even when there is no failure in the parking lock sensor Se4, if the lock state of the parking lock mechanism 10 is an invalid lock state (step #30: No and step #31: No), or if there is a failure in the parking lock sensor Se4 and the vehicle speed is higher than the first threshold (step #30: Yes and step #33: No), the parking range is not selected, and processing proceeds to a determination as to whether to select the forward range (step #34 to #36). If the rotational speed ratio between the input rotational speed and output rotational speed of the automatic transmission 1 matches a value obtained when the specific shift speed is formed (step #34: Yes), the state of the hydraulic circuit 41 matches a state obtained when the specific shift speed is formed (step #35: Yes), and furthermore, the vehicle speed is greater than or equal to the second threshold (step #36: Yes), the control device 30 selects the forward range (step

37). Unless an affirmative determination is made at all step #34 to #36, in other words, if a negative determination is made at even one of step #34 to #36, the neutral range is selected (step #38). Then, the control device 30 controls the automatic transmission 1 such that the selected shift range is formed (step #39). As such, when the control device 30 is abnormally activated during traveling of the vehicle (here, a state in which the vehicle speed is greater than or equal to the first threshold), if the transmission mechanism 50 is in a state other than a state in which the specific shift speed is formed, the control device 30 controls the automatic transmission 1 in the neutral range. The control of the automatic transmission 1 in the neutral range is performed during a period until selection of a shift range based on an operation on the to-be-operated part 91a is performed. Thus, for example, when the control device 30 is abnormally activated after the driver has intentionally performed an operation to shift the shift range from the forward range to the neutral range during traveling of the vehicle, since the specific shift speed is not formed in the transmission mechanism 50, the transmission mechanism 50 is maintained in a neutral state. Note that the determination order of step #34 to #36 can be changed as appropriate, and it is also possible to simultaneously make at least some of the determinations.

As described above, in the abnormal activation control according to the present embodiment, first, a determination process for determining whether to select the parking range is performed (step #31 to #33). Then, if it is not determined to select the parking range, a determination process for determining whether to select the forward range is performed next (step #34 to #36). Then, if it is not determined to select the forward range, the neutral range is selected.

Figure 7:
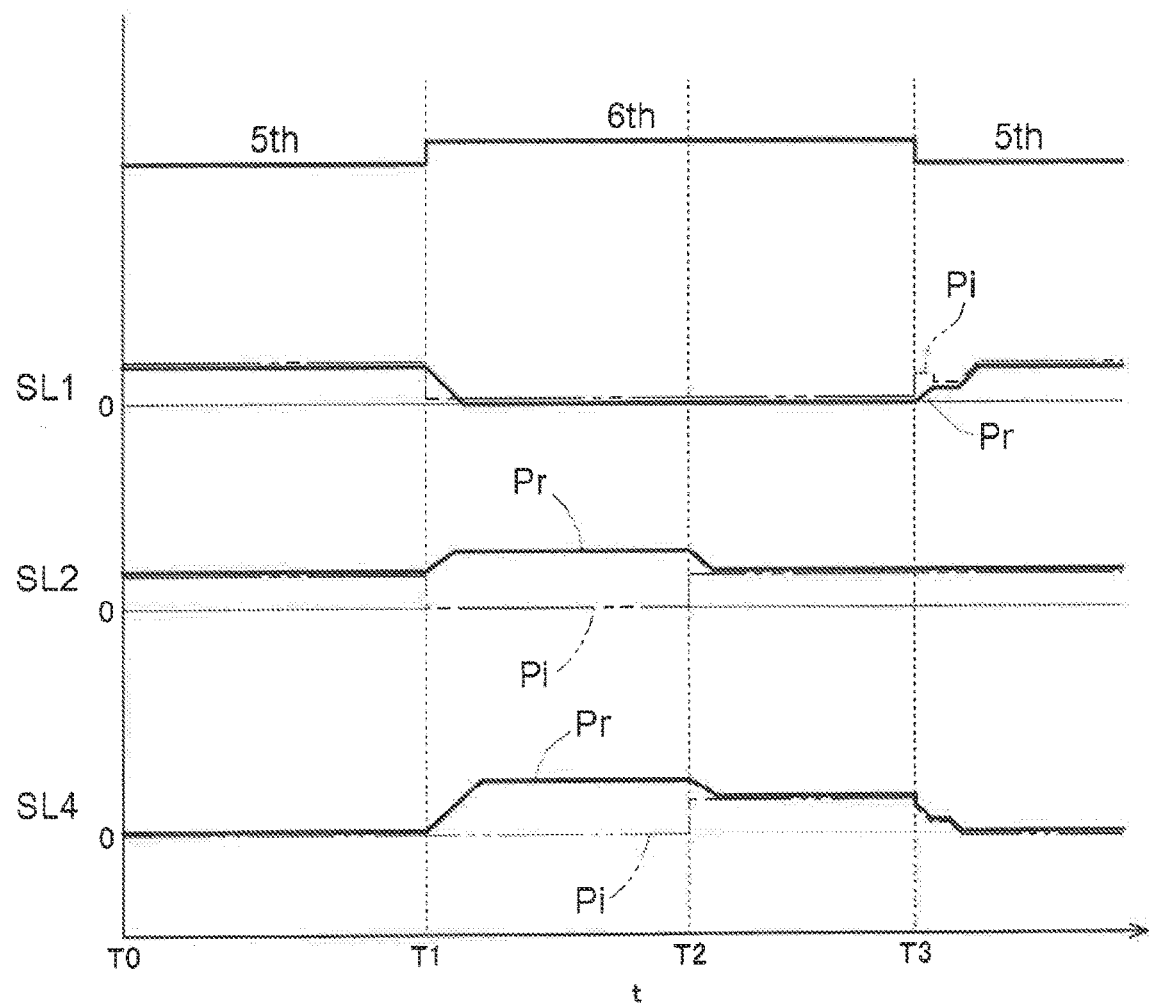
FIG. 7 is a time chart showing an example of control behavior according to the embodiment.
Figure 10:
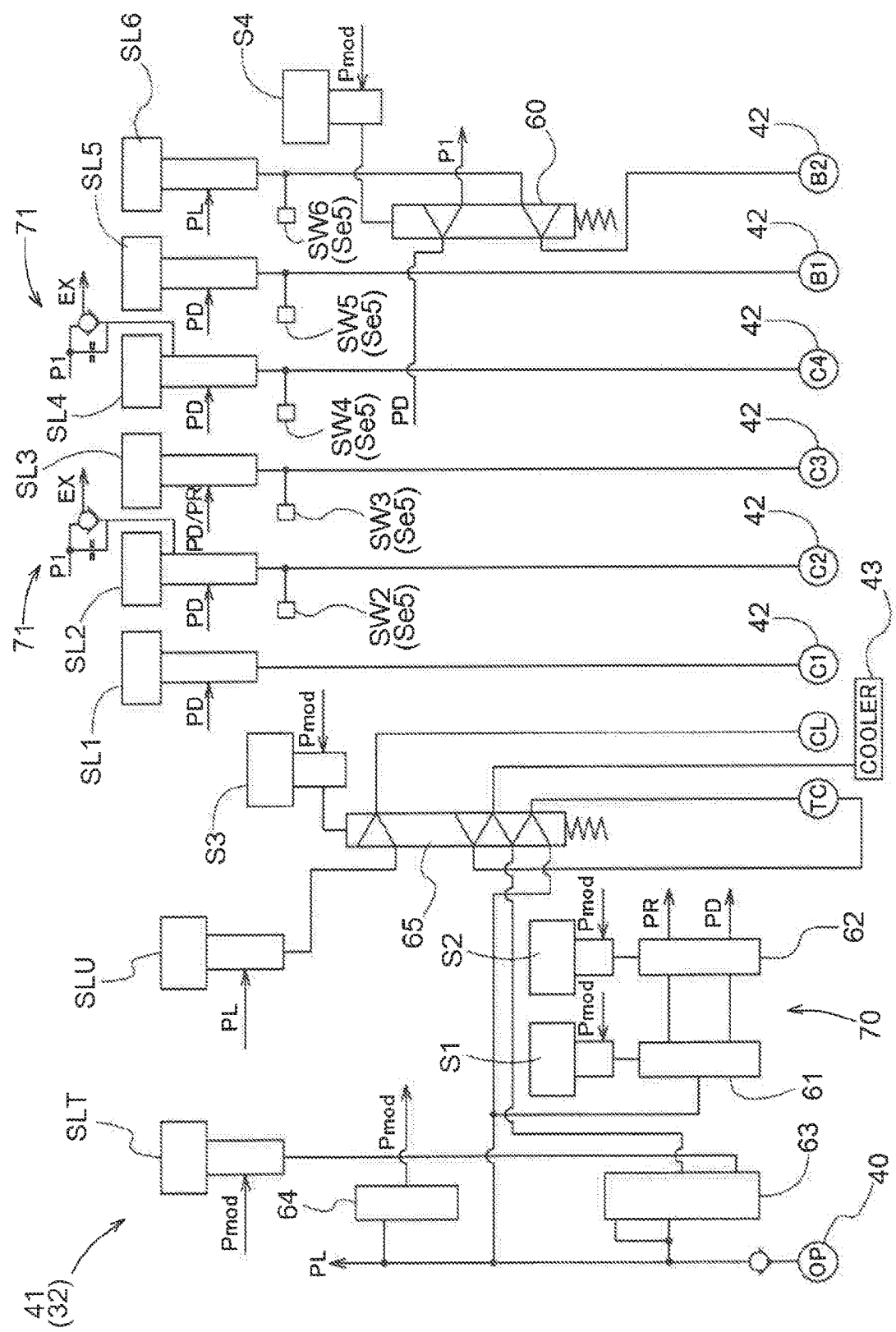
FIG. 10 is a schematic diagram of an example of a hydraulic circuit.

Specific operations of the abnormal activation control according to the present embodiment will be described with reference to an example shown in FIG. 7. Note that, in this example, a situation is assumed in which the control device 30 is abnormally activated during traveling in fifth shift speed 5th (during forward traveling), by which a sixth shift speed 6th which is the specific shift speed is formed, and the forward range is selected after the abnormal activation of the control device 30. FIG. 7 shows changes over time t of a hydraulic pressure instruction value Pi and actual output hydraulic pressure Pr for each solenoid valve (a first linear solenoid valve SL1, a second linear solenoid valve SL2, and a fourth linear solenoid valve SL4). Note that here a case is assumed in which the automatic transmission 1 shown in FIGS. 8 to 10 is a control target of the control device 30, and the fifth shift speed 5th is formed in a state in which a first clutch C1 that receives hydraulic pressure supply from the first linear solenoid valve SL1 and a second clutch C2 that receives hydraulic pressure supply from the second linear solenoid valve SL2 are engaged, and the sixth shift speed 6th is formed in a state in which the second clutch C2 and a fourth clutch C4 that receives hydraulic pressure supply from the fourth linear solenoid valve SL4 are engaged.

When, at time T1, a reset occurs in the control device 30 and all-off fail occurs in the solenoid valves, the hydraulic pressure instruction values for all solenoid valves become zero, but by the limp-home function, the sixth shift speed 6th serving as the specific shift speed is formed. Then, by abnormal activation control performed in association with the abnormal activation of the control device 30, the forward range is selected, and at time T2, control of the hydraulic control device 32 by the control device 30 for forming the forward range is resumed. Here, a case is exemplified in which upon resuming control for forming the forward range, first, control for forming the specific shift speed (here, the sixth shift speed 6th) is performed, and at a point in time thereafter, control for forming a target shift speed (here, the fifth shift speed 5th) which is determined based on an accelerator pedal position, a vehicle speed, etc., is performed. Namely, with the resumption of control of the hydraulic control device 32 by the control device 30, at time T2, a hydraulic pressure instruction for the second linear solenoid valve SL2 for engaging the second clutch C2 and a hydraulic pressure instruction for the fourth linear solenoid valve SL4 for engaging the fourth clutch C4 are generated, and by control of the hydraulic control device 32 by the control device 30, the sixth shift speed 6th is formed. Then, with the setting of the target shift speed to the fifth shift speed 5th, at time T3, a hydraulic pressure instruction for the first linear solenoid valve SL1 for engaging the first clutch C1 and a hydraulic pressure instruction for the fourth linear solenoid valve SL4 for disengaging the fourth clutch C4 are generated, and by control of the hydraulic control device 32 by the control device 30, the fifth shift speed 5th is formed.

Next, an example of the automatic transmission 1 which is a control target of the control device 30 will be described with reference to FIGS. 8 to 10. In an example shown in FIG. 8, the transmission mechanism 50 is configured to change the speed of rotation of the transmission input member 22 which is drive-coupled to the drive power source 20 via a torque converter TC, at a gear ratio determined according to a shift speed, and transmit the rotation to the transmission output member 23. Though not shown, the transmission output member 23 is drive-coupled to two left and right wheels via an output differential gear device. The torque converter TC is provided with a lock-up clutch CL that directly couples an output member (drive output member 21) of the drive power source 20 to the transmission input member 22.

Figure 8:
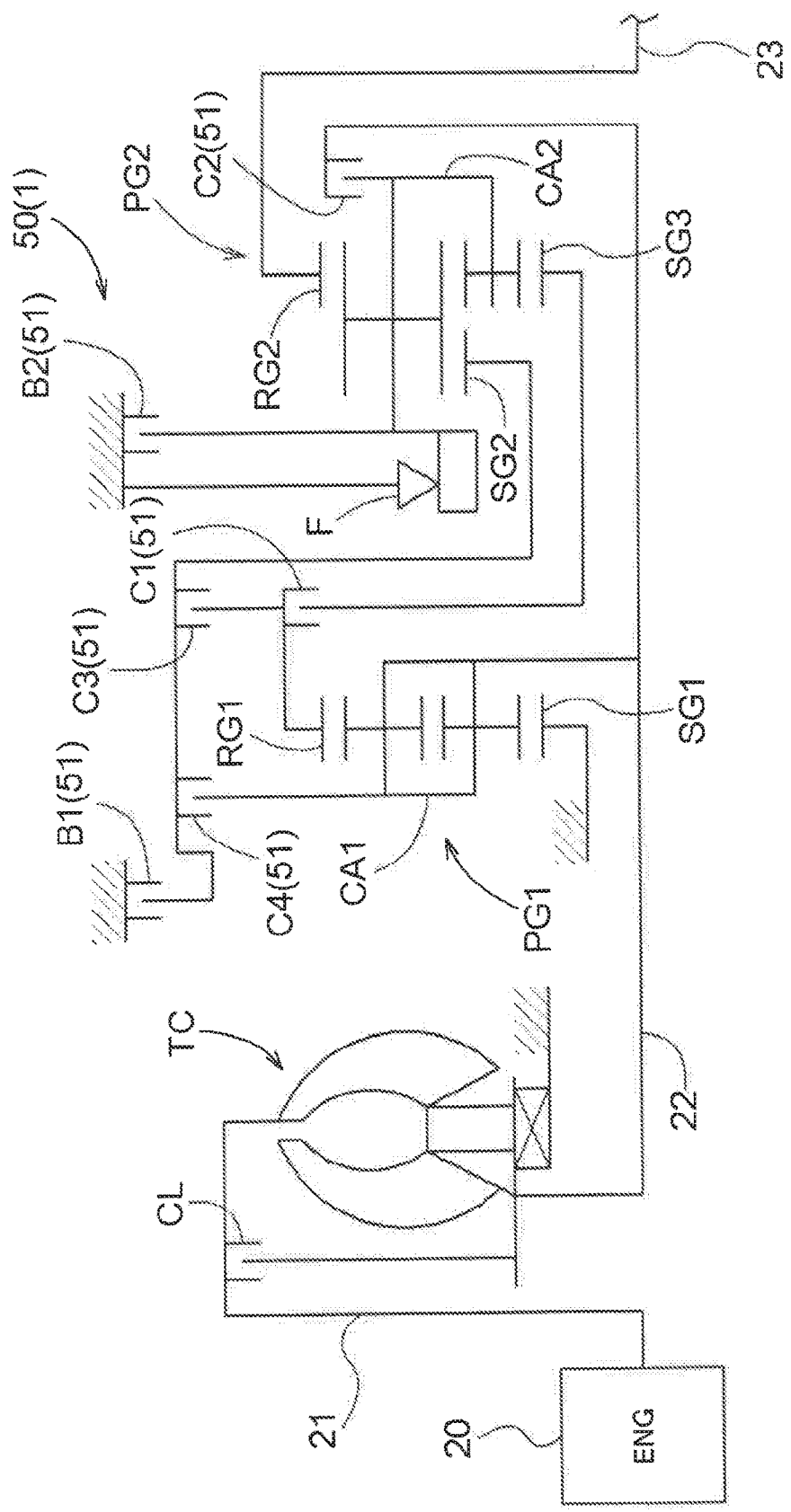
FIG. 8 is a skeleton diagram of an example of an automatic transmission.

As shown in FIG. 8, the transmission mechanism 50 is configured by a combination of two planetary gear mechanisms: the first planetary gear mechanism PG1 and the second planetary gear mechanism PG2. The first planetary gear mechanism PG1 is a double-pinion planetary gear mechanism including three rotating elements (a first sun gear SG1, a first carrier CA1, and a first ring gear RG1). In addition, the second planetary gear mechanism PG2 is a Ravigneaux planetary gear mechanism including four rotating elements (a second sun gear SG2, a third sun gear SG3, a second carrier CA2, and a second ring gear RG2). Namely, the second carrier CA2 supports a plurality of long pinion gears that mesh with the second sun gear SG2 and mesh with the second ring gear RG2, and a plurality of short pinion gears that mesh with the long pinion gears and mesh with the third sun gear SG3.

The transmission mechanism 50 includes a plurality of transmission engagement devices 51. Specifically, the transmission mechanism 50 includes the first clutch C1, the second clutch C2, a third clutch C3, the fourth clutch C4, a first brake B1, and a second brake B2. In addition, the transmission mechanism 50 includes a one-way clutch F in addition to the plurality of transmission engagement devices 51. The transmission mechanism 50 selectively forms any one of a plurality of shift speeds, according to the state of engagement of each of the transmission engagement devices 51 and the one-way clutch F. Specifically, two transmission engagement devices 51 (or one transmission engagement device 51 and the one-way clutch F) are engaged according to an operation table shown in FIG. 9, by which eight forward shift speeds with different gear ratios (first shift speed 1st, second shift speed 2nd, third shift speed 3rd, fourth shift speed 4th, fifth shift speed 5th, sixth shift speed 6th, seventh shift speed 7th, and eighth shift speed 8th in order from the largest gear ratio to the smallest) and a reverse shift speed (R) are selectively formed. In the neutral range (N) and the parking range (P), all transmission engagement devices 51 are disengaged and the transmission mechanism 50 goes into a neutral state. Note that in FIG. 9 "(o)" indicates that a clutch/brake is controlled to an engaged state in a situation in which braking (so-called engine braking) using the rotation resistance of an internal combustion engine serving as the drive power source 20 or regenerative braking by a rotating electrical machine serving as the drive power source 20 is performed.

FIG. 10 shows an example of the hydraulic control device 32 (hydraulic circuit 41) that can be used to control the transmission mechanism 50 shown in FIG. 8. The hydraulic control device 32 includes a plurality of solenoid valves. Specifically, the hydraulic control device 32 includes, as on/off solenoid valves, a first solenoid valve S1, a second solenoid valve S2, a third solenoid valve S3, and a fourth solenoid valve S4 and includes, as linear solenoid valves, the first linear solenoid valve SL1, the second linear solenoid valve SL2, a third linear solenoid valve SL3, the fourth linear solenoid valve SL4, a fifth linear solenoid valve SL5, a sixth linear solenoid valve SL6, a line pressure control valve SLT, and a lock-up control valve SLU. The control device 30 switches the state of the transmission mechanism 50 between a state corresponding to the forward range (a state in which any one of the forward shift speeds is formed), a state corresponding to the reverse range (a state in which the reverse shift speed is formed), and a state corresponding to the neutral range or the parking range (a neutral state in which none of the shift speeds are formed), by controlling the state of power supply (current-carrying state) to each of those solenoid valves.

As shown in FIG. 10, the hydraulic control device 32 includes the line pressure regulator valve 63, a modulator valve 64, and a lock-up relay valve 65. The line pressure regulator valve 63 is a valve that regulates the hydraulic pressure of oil discharged from the hydraulic pump 40 to line pressure PL. The control device 30 controls the line pressure control valve SLT such that hydraulic pressure (signal pressure) corresponding to target line pressure is outputted to the line pressure regulator valve 63, and the line pressure PL is regulated by the line pressure regulator valve 63 according to the target line pressure. The modulator valve 64 is a valve that generates modulator pressure P mod by reducing the line pressure PL.

The lock-up relay valve 65 is a valve that switches the state of hydraulic pressure supply to the lock-up clutch CL. The state of the lock-up relay valve 65 is switched between a state in which the lock-up clutch CL is engaged and a state in which the lock-up clutch CL is disengaged, according to hydraulic pressure inputted to the lock-up relay valve 65 from the third solenoid valve S3. When the state of the lock-up relay valve 65 is a state in which the lock-up clutch CL is engaged, hydraulic pressure outputted from the lock-up control valve SLU is supplied to the lock-up clutch CL through the lock-up relay valve 65. Note that the lock-up relay valve 65 includes a port that outputs oil to the torque converter TC (specifically, a power transmission chamber or a cycle oil chamber; the same applies hereinafter); a port to which oil emitted from the torque converter TC is inputted; and a port that outputs oil to an oil cooler 43, and the lock-up relay valve 65 is configured to be switchable to a state in which oil is supplied to the torque converter TC and oil emitted from the torque converter TC is supplied to the oil cooler 43.

The hydraulic control device 32 includes a range shifting part 70 that generates a forward range pressure PD or a reverse range pressure PR, based on the line pressure PL. The forward range pressure PD outputted from the range shifting part 70 is supplied to the first linear solenoid valve SL1, the second linear solenoid valve SL2, the third linear solenoid valve SL3, the fourth linear solenoid valve SL4, and the fifth linear solenoid valve SL5. In addition, the reverse range pressure PR outputted from the range shifting part 70 is supplied to the third linear solenoid valve SL3.

The range shifting part 70 includes a first switching valve 61 whose state is switched according to hydraulic pressure inputted from the first solenoid valve S1; and a second switching valve 62 whose state is switched according to hydraulic pressure inputted from the second solenoid valve S2. When the control device 30 controls the automatic transmission 1 in the forward range, the control device 30 controls the current-carrying states of the first solenoid valve S1 and the second solenoid valve S2 such that the forward range pressure PD is outputted from the range shifting part 70, and when the control device 30 controls the automatic transmission 1 in the reverse range, the control device 30 controls the current-carrying states of the first solenoid valve S1 and the second solenoid valve S2 such that the reverse range pressure PR is outputted from the range shifting part 70. In addition, when the control device 30 controls the automatic transmission 1 in the neutral range or the parking range, the control device 30 controls the current-carrying states of the first solenoid valve S1 and the second solenoid valve S2 such that neither of the forward range pressure PD and the reverse range pressure PR is outputted from the range shifting part 70.

The first switching valve 61 is configured to be switched to a state of outputting the line pressure PL, as hydraulic pressure for the forward range, to the second switching valve 62 when current is not carried through the first solenoid valve S1, and switched to a state of outputting the line pressure PL, as hydraulic pressure for the reverse range, to the second switching valve 62 when current is carried through the first solenoid valve S1. In addition, the second switching valve 62 is configured to be switched to a state of outputting, as the forward range pressure PD, the hydraulic pressure for the forward range supplied from the first switching valve 61 and shutting off the hydraulic pressure for the reverse range supplied from the first switching valve 61, when current is not carried through the second solenoid valve S2, and switched to a state of outputting, as the reverse range pressure PR, the hydraulic pressure for the reverse range supplied from the first switching valve 61 and shutting off the hydraulic pressure for the forward range supplied from the first switching valve 61, when current is carried through the second solenoid valve S2. By this, when all-off fail occurs, the forward range pressure PD is outputted from the range shifting part 70.

Each linear solenoid valve (SL1 to SL6) includes an input port to which the forward range pressure PD, the reverse range pressure PR, or the line pressure PL is inputted; an output port that communicates with a hydraulic servomechanism 42 of a control-target transmission engagement device 51; and a drain port. For example, the first linear solenoid valve SL1 includes an input port to which the forward range pressure PD is inputted; an output port that communicates with a hydraulic servomechanism 42 of the first clutch C1; and a drain port. Each linear solenoid valve (SL1 to SL6) regulates hydraulic pressure inputted to its input port, according to current applied thereto, and supplies the regulated hydraulic pressure to a hydraulic servomechanism 42 of a control-target transmission engagement device 51.

In an example shown in FIG. 10, each linear solenoid valve (SL1 to SL6) is a normally-closed solenoid valve that is closed when current is not carried therethrough. Thus, when all-off fail occurs, in all linear solenoid valves (SL1 to SL6), the drain port communicates with the output port and hydraulic pressure supplied to the input port is shut off. In such a configuration, in order to allow the transmission mechanism 50 to form the specific shift speed when all-off fail occurs (when power supply to the hydraulic control device 32 is interrupted) in a state in which a power transmission state is implemented by the forward range in the transmission mechanism 50, the hydraulic control device 32 is configured such that when all-off fail occurs, hydraulic pressure is reversely inputted to the drain ports of linear solenoid valves (hereinafter, referred to as "specific solenoid valves") associated with the specific engagement devices (transmission engagement devices 51 that are engaged to form the specific shift speed), by which the specific engagement devices are engaged.

Specifically, the hydraulic control device includes a fail-safe valve 60 whose state is switched according to hydraulic pressure inputted from the fourth solenoid valve S4; and reverse input parts 71 that input hydraulic pressure (first hydraulic pressure P1 described below) supplied from the fail-safe valve 60, to the drain ports of the specific solenoid valves. In the example shown in FIG. 10, since the specific engagement devices are the second clutch C2 and the fourth clutch C4 (i.e., the specific shift speed is the sixth shift speed 6th), the specific solenoid valves are the second linear solenoid valve SL2 and the fourth linear solenoid valve SL4, and the reverse input parts 71 are provided to those two specific solenoid valves, respectively.

The fail-safe valve 60 includes an input port to which the forward range pressure PD outputted from the range shifting part 70 is inputted; and an output port that communicates with the reverse input parts 71. The fail-safe valve 60 is configured to be switched to a state of shutting off the forward range pressure PD inputted thereto, when current is carried through the fourth solenoid valve S4, and switched to a state of outputting the forward range pressure PD inputted thereto, as the first hydraulic pressure P1 when current is not carried through the fourth solenoid valve S4. During the activation of the control device 30, the fourth solenoid valve S4 is basically in a current-carrying state in which power is supplied, and thus, the first hydraulic pressure P1 is not outputted from the fail-safe valve 60. When all-off fail occurs, the fourth solenoid valve S4 goes into a non-current-carrying state, by which the fail-safe valve 60 goes into a state of outputting the first hydraulic pressure P1. Note that, in this example, the fourth solenoid valve S4 is a normally-opened solenoid valve that is opened when current is not carried therethrough, and when all-off fail occurs, the state of the fail-safe valve 60 is switched to a state of outputting the forward range pressure PD as the first hydraulic pressure P1, by hydraulic pressure inputted to the fail-safe valve 60 from the fourth solenoid valve S4.

Each reverse input part 71 includes a check valve and an orifice. The check valve is provided to allow the emission of hydraulic pressure from the drain port of the specific solenoid valve in a state in which all-off fail has not occurred. Hence, when all-off fail occurs, the first hydraulic pressure P1 supplied to the reverse input part 71 from the fail-safe valve 60 is inputted to the drain port of the specific solenoid valve through the orifice provided in parallel with the check valve. Note that in this state the check valve is maintained in a closed state by the first hydraulic pressure P1. Then, by supplying the first hydraulic pressure P1 inputted to the drain port of the specific solenoid valve to the hydraulic servomechanism 42 of the specific engagement device from the output port of the specific solenoid valve, the specific engagement device is engaged. In the example shown in FIG. 10, the second clutch C2 and the fourth clutch C4 are engaged, forming the sixth shift speed 6th. Thus, even if all-off fail occurs during traveling in the forward range, by supplying hydraulic pressure to the hydraulic servomechanisms 42 of the respective specific engagement devices, it becomes possible to continue the forward travel in a fixed shift speed (here, the sixth shift speed 6th). Though a detail is omitted, the hydraulic control device 32 is configured such that such reverse input of first hydraulic pressure P1 (forward range pressure PD) to the drain ports of the specific solenoid valves through the fail-safe valve 60 and the reverse input parts 71 is performed only when a power transmission state is implemented by the forward range in the transmission mechanism 50 upon the occurrence of all-off fail (upon the interruption of power supply to the hydraulic control device 32).

As shown in FIG. 10, the hydraulic control device 32 includes, for each linear solenoid valve (SL2 to SL6), a hydraulic pressure sensor Se5 that detects hydraulic pressure outputted from an output port communicating with a hydraulic servomechanism 42 of a control-target transmission engagement device 51. Specifically, a second hydraulic pressure switch SW2 is provided to the second linear solenoid valve SL2, a third hydraulic pressure switch SW3 is provided to the third linear solenoid valve SL3, a fourth hydraulic pressure switch SW4 is provided to the fourth linear solenoid valve SL4, a fifth hydraulic pressure switch SW5 is provided to the fifth linear solenoid valve SL5, and a sixth hydraulic pressure switch SW6 is provided to the sixth linear solenoid valve SL6. In this example, since the specific engagement devices are formed by engaging the second clutch C2 and the fourth clutch C4, when each of the second hydraulic pressure switch SW2 and the fourth hydraulic pressure switch SW4 has detected hydraulic pressure supply to a hydraulic servomechanism 42 from an output port (supply of hydraulic pressure greater than or equal to a predetermined pressure), the control device 30 can determine that the state of the hydraulic circuit 41 matches the state obtained when the specific shift speed is formed (i.e., the specific shift speed is formed in the transmission mechanism 50).

Note that although here a case in which there is one specific shift speed is described as an example, the configuration can also be such that when power supply to the hydraulic control device 32 is interrupted, a plurality of forward shift speeds with different gear ratios can be formed as specific shift speeds. For example, the configuration can also be such that a plurality of forward shift speeds are divided into a first group to which shift speeds on the low-speed side (high gear ratio side) belong, and a second group to which shift speeds on the high-speed side (low gear ratio side) belong, and when a shift speed used at the point in time of interruption of power supply to the hydraulic control device 32 belongs to the first group, a first specific shift speed is formed, and when a shift speed used at the point in time of interruption of power supply to the hydraulic control device 32 belongs to the second group, a second specific shift speed having a different gear ratio (e.g., a lower gear ratio) than the first specific shift speed is formed. In this case, the control device 30 is configured such that when the control device 30 is abnormally activated during traveling of the vehicle, if the transmission mechanism 50 is in a state in which either one of the specific shift speeds is formed, the control device 30 controls the automatic transmission 1 in the forward range.

Other Embodiments

Next, other embodiments of the control device will be described.

(1) The above-described embodiment describes, as an example, a configuration in which in abnormal activation control, a determination as to whether the specific shift speed is formed is made based on the rotational speed ratio between the input rotational speed and output rotational speed of the automatic transmission 1 and the state of the hydraulic circuit 41. However, the configuration is not limited thereto, and the configuration can also be such that a determination as to whether the specific shift speed is formed is made based on only one of the rotational speed ratio between the input rotational speed and output rotational speed of the automatic transmission 1 and the state of the hydraulic circuit 41. Namely, the control device 30 can be configured to determine whether the transmission mechanism 50 is in a state in which the specific shift speed is formed, based on only a comparison between detection information of a rotational speed ratio between the input rotational speed and output rotational speed of the transmission mechanism 50 and the gear ratio of the specific shift speed, or the control device 30 can be configured to determine whether the transmission mechanism 50 is in a state in which the specific shift speed is formed, based on only a comparison between detection information obtained by the hydraulic pressure sensors Se5 and the states of engagement of respective transmission engagement devices 51 obtained when the specific shift speed is formed. In addition, the control device can also be configured to determine whether the specific shift speed is formed, based on at least either one of pieces of information including a rotational speed ratio between the input rotational speed and output rotational speed of the automatic transmission 1 and the state of the hydraulic circuit 41, and based also on different information than the above-described information.

(2) The above-described embodiment describes, as an example, a configuration in which it is determined that the activation of the control device 30 is normal activation on the conditions that the vehicle speed is zero, the output rotational speed of the drive power source 20 of the vehicle is zero, there is no discharge of hydraulic pressure from the hydraulic pump 40, and furthermore, there is no failure in the parking lock sensor Se4. However, the configuration is not limited thereto, and the configuration can also be such that a determination as to whether the activation of the control device 30 is normal activation is made using only some of those four conditions. For example, the configuration can be such that it is determined that the activation of the control device 30 is normal activation on the conditions that the vehicle speed is zero and the output rotational speed of the drive power source 20 of the vehicle is zero. In addition, for example, the configuration can also be such that it is determined that the activation of the control device 30 is normal activation on the conditions that the vehicle speed is zero, the output rotational speed of the drive power source 20 of the vehicle is zero, and furthermore there is no discharge of hydraulic pressure from the hydraulic pump 40. In addition, the configuration can also be such that a determination as to whether the activation of the control device 30 is normal activation is made based further on other conditions in addition to all or some of the above-described four conditions.

(3) The above-described embodiment describes, as an example, a configuration in which the control device 30 performs an activation type determination process after activation. However, the configuration is not limited thereto, and the configuration can also be such that after activation of the control device 30, the control device 30 does not perform an activation type determination process. For example, the configuration can also be such that another control device (e.g., the drive power source control device 31) provided in the vehicle is configured to monitor the state (the occurrence of a reset, etc.) of the control device 30, and when the control device 30 has received, upon its activation, a signal indicating that abnormal activation has occurred in the control device 30 from that another control device, the control device 30 performs abnormal activation control, and when the control device 30 has not received the above-described signal, the control device 30 performs normal activation control.

(4) The above-described embodiment describes, as an example, a configuration in which the lock state of the parking lock mechanism 10 is switched by the hydraulic actuator 14. However, the configuration is not limited thereto, and the configuration can also be such that the lock state of the parking lock mechanism 10 is switched by a motor-driven actuator that operates in response to an instruction from the control device 30.

(5) Note that the configuration disclosed in each of the above-described embodiments can also be applied in combination with configurations disclosed in other embodiments as long as a contradiction does not arise (including a combination of embodiments described as other embodiments). Regarding other configurations, too, the embodiments disclosed in the present description are in all respects merely illustrative. Therefore, various modifications can be made as appropriate without departing from the spirit and scope of the present disclosure.

Summary of the Above-Described Embodiments

A summary of the control device described above will be described below.

In a shift-by-wire type control device (30) whose control target is an automatic transmission (1) including a parking lock mechanism (10), and which controls, when selection of a shift range based on an operation on a to-be-operated part (91*a*) is performed, the automatic transmission (1) in response to an instruction to select the shift range, the automatic transmission (1) includes a transmission mechanism (50) including a hydraulic actuated transmission engagement device (51); and a hydraulic control device (32) that includes a solenoid and controls hydraulic pressure supplied to the transmission engagement device (51), the solenoid operating by receiving power supply, the hydraulic control device (32) is configured to form a specific shift speed in the transmission mechanism (50) when power supply to the hydraulic control device (32) is interrupted in a state in which a power transmission state is implemented by a forward range in the transmission mechanism (50), the specific shift speed being a predetermined forward shift speed, and the automatic transmission (1) is controlled in the forward range when the transmission mechanism (50) is in a state in which the specific shift speed is formed, when the control device (30) is abnormally activated due to interruption of power supply to the control device (30) during traveling of a vehicle.

According to this configuration, when the control device (30) is abnormally activated during traveling of the vehicle, it can be determined whether the forward range has been selected before the abnormal activation, based on whether the specific shift speed is formed in the transmission mechanism (50). Then, in a situation in which it is estimated that the forward range has been selected before the abnormal activation of the control device (30), the automatic transmission (1) can be controlled in the forward range after the abnormal activation of the control device (30). Thus, when the control device (30) is abnormally activated during traveling of the vehicle in the forward range, the travel in the forward range can be continued, and as a result, it becomes possible to suppress a reduction in driver's drivability associated with the abnormal activation of the control device (30).

Here, the configuration is preferably such that the hydraulic control device (32) is configured to place the transmission mechanism (50) in a neutral state when the power supply to the hydraulic control device (32) is interrupted in a state in which a power transmission state is interrupted in a neutral range in the transmission mechanism (50), and the automatic transmission (1) is controlled in the neutral range when the transmission mechanism (50) is in a state other than the state in which the specific shift speed is formed, when the control device (30) is abnormally activated during traveling of the vehicle.

If the specific shift speed has not been formed in the transmission mechanism (50) when the control device (30) is abnormally activated during traveling of the vehicle, it is estimated that the forward range has not been selected before the abnormal activation, and since the vehicle is traveling, it is less likely that the parking range has been selected before the abnormal activation. According to the above-described configuration, since the automatic transmission (1) can be controlled in the neutral range in such a situation, it becomes possible to avoid that the state of the automatic transmission (1) after the abnormal activation of the control device (30) results in a state greatly deviating from a driver's intention.

Note that in such a situation, there is also a possibility that the reverse range has been selected before the abnormal activation; however, since the travel in the reverse range basically has a low speed, a reduction in driver's drivability caused by not controlling the automatic transmission (1) in the reverse range after the abnormal activation of the control device (30) is limited.

In addition, the configuration is preferably such that when there is a failure in a sensor (Se4) that detects a lock state of the parking lock mechanism (10) and a vehicle speed is less than or equal to a predetermined threshold when the control device (30) is abnormally activated, the automatic transmission (1) is controlled in a parking range, regardless of whether the specific shift speed is formed in the transmission mechanism (50).

According to this configuration, it becomes possible to avoid that when the parking lock mechanism (10) is in a valid lock state, the lock state is switched from the valid lock state to an invalid lock state against a driver's will, by which the vehicle moves. Note that in this configuration when there is a failure in the sensor (Se4) and the parking lock mechanism (10) is in an invalid lock state, too, if the vehicle speed is less than or equal to the predetermined threshold, the lock state is switched from the invalid lock state to a valid lock state, but since the vehicle is in a state of being stopped or having a low vehicle speed, vehicle behavior has limited influence.

In addition, the configuration is preferably such that it is determined whether the transmission mechanism (50) is in a state in which the specific shift speed is formed, based on a comparison between detection information of a rotational speed ratio between an input rotational speed and an output rotational speed of the transmission mechanism (50) and a gear ratio of the specific shift speed.

According to this configuration, it becomes possible to accurately determine whether the specific shift speed is formed, based on detection information which is a rotational speed ratio between the input rotational speed and output rotational speed of the transmission mechanism (50) and which has a predetermined value when the specific shift speed is formed.

In addition, the configuration is preferably such that the transmission mechanism (50) includes a plurality of transmission engagement devices (51), the hydraulic control device (32) includes hydraulic pressure sensors (Se5) that detect states of hydraulic pressure supply to at least some of the plurality of transmission engagement devices (51), and it is determined whether the transmission mechanism (50) is in a state in which the specific shift speed is formed, based on a comparison between detection information obtained by the hydraulic pressure sensors (Se5) and states of engagement of respective transmission engagement devices (51) obtained when the specific shift speed is formed.

According to this configuration, it becomes possible to accurately determine whether the specific shift speed is formed, based on detection information which is the states of hydraulic pressure supply to transmission engagement devices (51) and which goes into a predetermined state when the specific shift speed is formed.

In addition, the configuration is preferably such that after activation of the control device (30), it is determined whether the activation is the abnormal activation or normal activation taking place after activation of the vehicle, and when it is determined that the activation is the normal activation, the automatic transmission (1) is controlled in either one of the neutral range and the parking range.

When the control device (30) is normally activated, it is difficult to assume a situation in which controlling the automatic transmission (1) in the forward range or the reverse range responds to a driver's will. In view of this, in the above-described configuration, when it is determined that the activation is normal activation, shift range options do not include the forward range and the reverse range, and thus, the time from when the control device (30) is normally activated until control of the automatic transmission (1) starts in any one of shift ranges can be reduced.

The configuration is preferably such that in a configuration in which, as described above, after activation of the control device (30), it is determined whether the activation is the abnormal activation or the normal activation, it is determined that the activation is the normal activation on conditions that at least the vehicle speed is zero and an output rotational speed of a drive power source (20) of the vehicle is zero.

According to this configuration, it becomes possible to appropriately determine whether the activation of the control device (30) is abnormal activation or normal activation, considering the fact that when the activation of the control device (30) is normal activation taking place after activation of the vehicle, the vehicle speed is likely to be zero and the output rotational speed of the drive power source (20) is likely to be zero.

Here, the configuration is preferably such that it is determined that the activation is the normal activation on a further condition that at least either one of a condition that there is no discharge of hydraulic pressure from a hydraulic pump (40) that supplies hydraulic pressure to the automatic transmission (1) and a condition that there is no failure in the sensor (Se4) that detects the lock state of the parking lock mechanism (10) holds true.

According to the above-described configuration, by including a condition that there is no discharge of hydraulic pressure from the hydraulic pump (40) in conditions for determining normal activation, it becomes possible to increase the accuracy of a determination as to whether the activation of the control device (30) is abnormal activation or normal activation. For example, the vehicle that performs idle reduction control in which an internal combustion engine serving as the drive power source (20) of the vehicle is stopped with the vehicle's main power source remaining in an on state may include a motor-driven oil pump that is driven by a dedicated rotating electrical machine; and an accumulator that operates (accumulates or discharges) using discharge pressure of the motor-driven oil pump as operating pressure. In this case, when the control device (30) is abnormally activated while the vehicle is being stopped and idle reduction control is being performed, upon the abnormal activation of the control device (30), the vehicle speed is in a zero state and the output rotational speed of the drive power source of the vehicle is in a zero state, but the motor-driven oil pump serving as the hydraulic pump (40) goes into a state of discharging hydraulic pressure according to the operating pressure of the accumulator, instead of going into a state of no discharge of hydraulic pressure. By including a condition that there is no discharge of hydraulic pressure from the hydraulic pump (40) in conditions for determining normal activation as described above, it becomes possible to accurately determine that the activation of the control device (30) in the above-described situation is not normal activation but abnormal activation.

In addition, according to the above-described configuration, by including a condition that there is no failure in the sensor (Se4) that detects the lock state of the parking lock mechanism (10) in conditions for determining normal activation, it becomes possible to appropriately control the automatic transmission (1) such that when there is a failure in the sensor (Se4), the activation is not normal activation control but abnormal activation control.

The control device according to the present disclosure provides at least one of the above-described advantageous effects.

The invention claimed is:

1. A shift-by-wire type control device whose control target is an automatic transmission including a parking lock mechanism, the shift-by-wire type control device comprising:
    an electronic control unit that controls the automatic transmission in response to an instruction to select a shift range when selection of the shift range based on an operation on a to-be-operated part is performed, wherein:
        the automatic transmission includes a transmission mechanism including a hydraulic actuated transmission engagement device;
        the electronic control unit controls a hydraulic control device that includes a solenoid and that controls hydraulic pressure supplied to the transmission engagement device, the solenoid operating by receiving power supply,
        the hydraulic control device is configured to form a specific shift speed in the transmission mechanism when power supply to the hydraulic control device is interrupted in a state in which a power transmission state is implemented by a forward range in the transmission mechanism, the specific shift speed being a predetermined forward shift speed, and
        the automatic transmission is controlled in the forward range when the transmission mechanism is in a state in which the specific shift speed is formed, when the electronic control unit is abnormally activated due to interruption of power supply to the electronic control unit during traveling of a vehicle.

2. The control device according to claim 1, wherein
    the hydraulic control device is configured to place the transmission mechanism in a neutral state when the power supply to the hydraulic control device is interrupted in a state in which the power transmission state is interrupted in a neutral range in the transmission mechanism, and
    the automatic transmission is controlled in the neutral range when the transmission mechanism is in a state other than the state in which the specific shift speed is formed, when the electronic control unit is abnormally activated during traveling of the vehicle.

3. The control device according to claim 2, wherein when there is a failure in a sensor that detects a lock state of the parking lock mechanism and a vehicle speed is less than or equal to a predetermined threshold when the electronic control unit is abnormally activated, the automatic transmission is controlled in a parking range, regardless of whether the specific shift speed is formed in the transmission mechanism.

4. The control device according to claim 3, wherein the electronic control unit determines whether the transmission mechanism is in a state in which the specific shift speed is formed, based on a comparison between detection information of a rotational speed ratio between an input rotational speed and an output rotational speed of the transmission mechanism and a gear ratio of the specific shift speed.

5. The control device according to claim 4, wherein
    the transmission mechanism includes a plurality of transmission engagement devices,
    the hydraulic control device includes hydraulic pressure sensors that detect states of hydraulic pressure supply to at least some of the plurality of transmission engagement devices, and
    the electronic control unit determines whether the transmission mechanism is in a state in which the specific shift speed is formed, based on a comparison between detection information obtained by the hydraulic pressure sensors and states of engagement of respective transmission engagement devices obtained when the specific shift speed is formed.

6. The control device according to claim 5, wherein
    after activation of the electronic control unit, the electronic control unit determines whether the activation is the abnormal activation or normal activation taking place after activation of the vehicle, and
    when the electronic control unit determines that the activation is the normal activation, the automatic transmission is controlled in either one of a neutral range and a parking range.

7. The control device according to claim 6, wherein the electronic control unit determines that the activation is the normal activation on conditions that at least the vehicle speed is zero and an output rotational speed of a drive power source of the vehicle is zero.

8. The control device according to claim 7, wherein the electronic control unit determines that the activation is the normal activation on a further condition that at least either one of a condition that there is no discharge of hydraulic pressure from a hydraulic pump that supplies hydraulic pressure to the automatic transmission and a condition that there is no failure in a sensor that detects the lock state of the parking lock mechanism holds true.

9. The control device according to claim 1, wherein when there is a failure in a sensor that detects a lock state of the parking lock mechanism and a vehicle speed is less than or equal to a predetermined threshold when the electronic control unit is abnormally activated, the automatic transmission is controlled in a parking range, regardless of whether the specific shift speed is formed in the transmission mechanism.

10. The control device according to claim 1, wherein the electronic control unit determines whether the transmission mechanism is in a state in which the specific shift speed is formed, based on a comparison between detection information of a rotational speed ratio between an input rotational speed and an output rotational speed of the transmission mechanism and a gear ratio of the specific shift speed.

11. The control device according to claim 1, wherein
the transmission mechanism includes a plurality of transmission engagement devices,
the hydraulic control device includes hydraulic pressure sensors that detect states of hydraulic pressure supply to at least some of the plurality of transmission engagement devices, and
the electronic control unit determines whether the transmission mechanism is in a state in which the specific shift speed is formed, based on a comparison between detection information obtained by the hydraulic pressure sensors and states of engagement of respective transmission engagement devices obtained when the specific shift speed is formed.

12. The control device according to claim 1, wherein
after activation of the electronic control unit, the electronic control unit determines whether the activation is the abnormal activation or normal activation taking place after activation of the vehicle, and
when the electronic control unit determines that the activation is the normal activation, the automatic transmission is controlled in either one of a neutral range and a parking range.

13. The control device according to claim 12, wherein the electronic control unit determines that the activation is the normal activation on conditions that at least the vehicle speed is zero and an output rotational speed of a drive power source of the vehicle is zero.

* * * * *